United States Patent
Li et al.

(10) Patent No.: US 11,625,124 B2
(45) Date of Patent: Apr. 11, 2023

(54) UNGROUNDED USER SIGNAL COMPENSATION FOR PIXELATED SELF-CAPACITANCE TOUCH SENSOR PANEL

(71) Applicant: Apple Inc., Cupertino, CA (US)

(72) Inventors: Yingxuan Li, Saratoga, CA (US); Marduke Yousefpor, San Jose, CA (US); Weijun Yao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/921,817

(22) Filed: Jul. 6, 2020

(65) Prior Publication Data

US 2020/0333902 A1 Oct. 22, 2020

Related U.S. Application Data

(63) Continuation of application No. 15/507,722, filed as application No. PCT/US2014/056795 on Sep. 22, 2014, now Pat. No. 10,705,658.

(51) Int. Cl.
*G06F 3/041* (2006.01)
*G06F 3/044* (2006.01)

(52) U.S. Cl.
CPC ........ *G06F 3/041662* (2019.05); *G06F 3/044* (2013.01); *G06F 3/0418* (2013.01); *G06F 3/0443* (2019.05); *G06F 2203/04103* (2013.01); *G06F 2203/04104* (2013.01)

(58) Field of Classification Search
CPC .................. G06F 3/044; G06F 3/0418; G06F 2203/04104; G06F 2203/04103; G06F 3/041662; G06F 3/0443
See application file for complete search history.

(56) References Cited

U.S. PATENT DOCUMENTS

| 4,087,625 A | 5/1978 | Dym et al. |
| 4,090,092 A | 5/1978 | Serrano |
| 4,304,976 A | 12/1981 | Gottbreht et al. |

(Continued)

FOREIGN PATENT DOCUMENTS

| CN | 1246638 A | 3/2000 |
| CN | 1527274 A | 9/2004 |

(Continued)

OTHER PUBLICATIONS

Advisory Action received for U.S. Appl. No. 11/818,498, dated May 17, 2013, 5 pages.

(Continued)

*Primary Examiner* — Patrick N Edouard
*Assistant Examiner* — Joseph P Fox
(74) *Attorney, Agent, or Firm* — Kubota & Basol LLP

(57) ABSTRACT

A touch controller is disclosed. The touch controller can include sense circuitry configured to sense, during a self-capacitance portion of a touch frame, first one or more self-capacitances associated with a first plurality of touch pixels on a touch sensor panel, and sense, during a mutual capacitance portion of the touch frame, first one or more mutual capacitances associated with the first plurality of touch pixels. A touch processor can be configured to, based on the first one or more self-capacitances and the first one or more mutual capacitances, sense a single touch event associated with the touch frame.

14 Claims, 9 Drawing Sheets

(56) References Cited

U.S. PATENT DOCUMENTS

| | | |
|---|---|---|
| 4,475,235 A | 10/1984 | Graham |
| 4,550,221 A | 10/1985 | Mabusth |
| 4,659,874 A | 4/1987 | Landmeier |
| 5,194,862 A | 3/1993 | Edwards |
| 5,317,919 A | 6/1994 | Awtrey |
| 5,459,463 A | 10/1995 | Gruaz et al. |
| 5,483,261 A | 1/1996 | Yasutake |
| 5,488,204 A | 1/1996 | Mead et al. |
| 5,543,590 A | 8/1996 | Gillespie et al. |
| 5,631,670 A | 5/1997 | Tomiyoshi et al. |
| 5,825,352 A | 10/1998 | Bisset et al. |
| 5,835,079 A | 11/1998 | Shieh |
| 5,841,078 A | 11/1998 | Miller et al. |
| 5,844,506 A | 12/1998 | Binstead |
| 5,880,411 A | 3/1999 | Gillespie et al. |
| 5,914,465 A | 6/1999 | Allen et al. |
| 5,923,997 A | 7/1999 | Miyanaga et al. |
| 6,057,903 A | 5/2000 | Colgan et al. |
| 6,137,427 A | 10/2000 | Binstead |
| 6,163,313 A | 12/2000 | Aroyan et al. |
| 6,188,391 B1 | 2/2001 | Seely et al. |
| 6,239,788 B1 | 5/2001 | Nohno et al. |
| 6,310,610 B1 | 10/2001 | Beaton et al. |
| 6,323,846 B1 | 11/2001 | Westerman et al. |
| 6,329,044 B1 | 12/2001 | Inoue et al. |
| 6,452,514 B1 | 9/2002 | Philipp |
| 6,456,952 B1 | 9/2002 | Nathan |
| 6,690,387 B2 | 2/2004 | Zimmerman et al. |
| 6,730,863 B1 | 5/2004 | Gerpheide et al. |
| 6,970,160 B2 | 11/2005 | Mulligan et al. |
| 7,015,894 B2 | 3/2006 | Morohoshi |
| 7,030,860 B1 | 4/2006 | Hsu et al. |
| 7,129,935 B2 | 10/2006 | Mackey |
| 7,138,686 B1 | 11/2006 | Banerjee et al. |
| 7,180,508 B2 | 2/2007 | Kent et al. |
| 7,184,064 B2 | 2/2007 | Zimmerman et al. |
| 7,337,085 B2 | 2/2008 | Soss |
| 7,395,717 B2 | 7/2008 | Deangelis et al. |
| 7,412,586 B1 | 8/2008 | Rajopadhye et al. |
| 7,504,833 B1 | 3/2009 | Seguine |
| 7,538,760 B2 | 5/2009 | Hotelling et al. |
| 7,548,073 B2 | 6/2009 | Mackey et al. |
| 7,580,030 B2 | 8/2009 | Marten |
| 7,639,234 B2 | 12/2009 | Orsley |
| 7,663,607 B2 | 2/2010 | Hotelling et al. |
| 7,701,539 B2 | 4/2010 | Shih et al. |
| 7,719,523 B2 | 5/2010 | Hillis |
| 7,864,503 B2 | 1/2011 | Chang |
| 7,907,126 B2 | 3/2011 | Yoon et al. |
| 7,932,898 B2 | 4/2011 | Philipp et al. |
| 8,026,904 B2 | 9/2011 | Westerman |
| 8,040,142 B1 | 10/2011 | Bokma et al. |
| 8,040,321 B2 | 10/2011 | Peng et al. |
| 8,040,326 B2 | 10/2011 | Hotelling et al. |
| 8,045,783 B2 | 10/2011 | Lee et al. |
| 8,058,884 B2 | 11/2011 | Betancourt |
| 8,068,097 B2 | 11/2011 | Guanghai |
| 8,120,371 B2 | 2/2012 | Day et al. |
| 8,125,312 B2 | 2/2012 | Orr |
| 8,169,421 B2 | 5/2012 | Wright et al. |
| 8,223,133 B2 | 7/2012 | Hristov |
| 8,258,986 B2 | 9/2012 | Makovetskyy |
| 8,259,078 B2 | 9/2012 | Hotelling et al. |
| 8,283,935 B2 | 10/2012 | Liu et al. |
| 8,319,747 B2 | 11/2012 | Hotelling et al. |
| 8,339,286 B2 | 12/2012 | Cordeiro |
| 8,441,464 B1 | 5/2013 | Lin et al. |
| 8,479,122 B2 | 7/2013 | Hotelling et al. |
| 8,484,838 B2 | 7/2013 | Badaye et al. |
| 8,487,898 B2 | 7/2013 | Hotelling |
| 8,507,811 B2 | 8/2013 | Hotelling et al. |
| 8,508,495 B2 | 8/2013 | Hotelling et al. |
| 8,525,756 B2 | 9/2013 | Kwon |
| 8,537,126 B2 | 9/2013 | Yousefpor et al. |
| 8,542,208 B2 | 9/2013 | Krah et al. |
| 8,576,193 B2 | 11/2013 | Hotelling |
| 8,593,410 B2 | 11/2013 | Hong et al. |
| 8,593,425 B2 | 11/2013 | Hong et al. |
| 8,614,688 B2 | 12/2013 | Chang |
| 8,633,915 B2 | 1/2014 | Hotelling et al. |
| 8,680,877 B2 | 3/2014 | Lee et al. |
| 8,760,412 B2 | 6/2014 | Hotelling et al. |
| 8,773,146 B1 | 7/2014 | Hills et al. |
| 8,810,543 B1 | 8/2014 | Kurikawa |
| 8,884,917 B2 | 11/2014 | Seo |
| 8,902,172 B2 | 12/2014 | Peng et al. |
| 8,922,521 B2 | 12/2014 | Hotelling et al. |
| 8,957,874 B2 | 2/2015 | Elias |
| 8,976,133 B2 | 3/2015 | Yao et al. |
| 8,982,096 B2 | 3/2015 | Hong et al. |
| 8,982,097 B1 | 3/2015 | Kuzo et al. |
| 9,001,082 B1 | 4/2015 | Rosenberg et al. |
| 9,024,913 B1 | 5/2015 | Jung et al. |
| 9,035,895 B2 | 5/2015 | Bussat et al. |
| 9,075,463 B2 | 7/2015 | Pyo et al. |
| 9,086,774 B2 | 7/2015 | Hotelling et al. |
| 9,189,119 B2 | 11/2015 | Liao et al. |
| 9,261,997 B2 | 2/2016 | Chang et al. |
| 9,292,137 B2 | 3/2016 | Kogo |
| 9,329,674 B2 | 5/2016 | Lee et al. |
| 9,329,723 B2 | 5/2016 | Benbasat et al. |
| 9,372,576 B2 | 6/2016 | Westerman |
| 9,582,131 B2 | 2/2017 | Elias |
| 9,690,397 B2 | 6/2017 | Shepelev et al. |
| 9,785,295 B2 | 10/2017 | Yang et al. |
| 9,804,717 B2 | 10/2017 | Schropp, Jr. |
| 9,874,975 B2 | 1/2018 | Benbasat et al. |
| 9,880,655 B2 | 1/2018 | O'connor |
| 9,886,141 B2 | 2/2018 | Yousefpor |
| 9,904,427 B1 | 2/2018 | Co et al. |
| 9,996,175 B2 | 6/2018 | Hotelling et al. |
| 10,001,888 B2 | 6/2018 | Hong et al. |
| 10,061,433 B2 | 8/2018 | Imai et al. |
| 10,073,562 B2 | 9/2018 | Mo et al. |
| 10,254,896 B2 | 4/2019 | Mori et al. |
| 10,365,764 B2 | 7/2019 | Korapati et al. |
| 10,725,591 B1 | 7/2020 | Maharyta et al. |
| 11,157,109 B1 | 10/2021 | Shorten et al. |
| 2002/0152048 A1 | 10/2002 | Hayes |
| 2003/0076325 A1 | 4/2003 | Thrasher |
| 2003/0164820 A1 | 9/2003 | Kent |
| 2003/0210235 A1 | 11/2003 | Roberts |
| 2004/0017362 A1 | 1/2004 | Mulligan et al. |
| 2004/0061687 A1 | 4/2004 | Kent et al. |
| 2004/0090429 A1 | 5/2004 | Geaghan et al. |
| 2004/0188151 A1 | 9/2004 | Gerpheide et al. |
| 2004/0189617 A1 | 9/2004 | Gerpheide et al. |
| 2004/0239650 A1 | 12/2004 | Mackey |
| 2004/0241920 A1 | 12/2004 | Hsiao et al. |
| 2005/0007353 A1 | 1/2005 | Smith et al. |
| 2005/0012724 A1 | 1/2005 | Kent |
| 2005/0069718 A1 | 3/2005 | Voss-Kehl et al. |
| 2005/0073507 A1 | 4/2005 | Richter et al. |
| 2005/0083307 A1 | 4/2005 | Aufderheide et al. |
| 2005/0104867 A1 | 5/2005 | Westerman et al. |
| 2005/0126831 A1 | 6/2005 | Richter et al. |
| 2005/0146509 A1 | 7/2005 | Geaghan et al. |
| 2005/0239532 A1 | 10/2005 | Inamura |
| 2005/0270039 A1 | 12/2005 | Mackey |
| 2005/0270273 A1 | 12/2005 | Marten |
| 2005/0280639 A1 | 12/2005 | Taylor et al. |
| 2006/0001640 A1 | 1/2006 | Lee |
| 2006/0017710 A1 | 1/2006 | Lee et al. |
| 2006/0038791 A1 | 2/2006 | Mackey |
| 2006/0132463 A1 | 6/2006 | Lee et al. |
| 2006/0146484 A1 | 7/2006 | Kim et al. |
| 2006/0197753 A1 | 9/2006 | Hotelling |
| 2006/0202969 A1 | 9/2006 | Hauck |
| 2006/0227115 A1 | 10/2006 | Fry |
| 2006/0238522 A1 | 10/2006 | Westerman et al. |
| 2006/0267953 A1 | 11/2006 | Peterson et al. |
| 2006/0278444 A1 | 12/2006 | Binstead |
| 2006/0279548 A1 | 12/2006 | Geaghan |
| 2006/0293864 A1 | 12/2006 | Soss |

(56) References Cited

U.S. PATENT DOCUMENTS

| | | |
|---|---|---|
| 2007/0008299 A1 | 1/2007 | Hristov |
| 2007/0012665 A1 | 1/2007 | Nelson et al. |
| 2007/0023523 A1 | 2/2007 | Onishi |
| 2007/0074914 A1 | 4/2007 | Geaghan et al. |
| 2007/0075982 A1 | 4/2007 | Morrison et al. |
| 2007/0216637 A1 | 9/2007 | Ito |
| 2007/0216657 A1 | 9/2007 | Konicek |
| 2007/0229468 A1 | 10/2007 | Peng et al. |
| 2007/0229470 A1 | 10/2007 | Snyder et al. |
| 2007/0247443 A1 | 10/2007 | Philipp |
| 2007/0262963 A1 | 11/2007 | Xiao-Ping et al. |
| 2007/0262969 A1 | 11/2007 | Pak |
| 2007/0268273 A1 | 11/2007 | Westerman et al. |
| 2007/0268275 A1 | 11/2007 | Westerman et al. |
| 2007/0279395 A1 | 12/2007 | Philipp et al. |
| 2007/0279619 A1 | 12/2007 | Chang |
| 2007/0283832 A1 | 12/2007 | Hotelling |
| 2007/0285365 A1 | 12/2007 | Lee |
| 2007/0296709 A1 | 12/2007 | Guanghai |
| 2008/0006454 A1 | 1/2008 | Hotelling |
| 2008/0007533 A1 | 1/2008 | Hotelling |
| 2008/0018581 A1 | 1/2008 | Park et al. |
| 2008/0024456 A1 | 1/2008 | Peng et al. |
| 2008/0036742 A1 | 2/2008 | Garmon |
| 2008/0042986 A1 | 2/2008 | Westerman et al. |
| 2008/0042987 A1 | 2/2008 | Westerman et al. |
| 2008/0042992 A1 | 2/2008 | Kim |
| 2008/0047764 A1 | 2/2008 | Lee et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0062151 A1 | 3/2008 | Kent |
| 2008/0074398 A1 | 3/2008 | Wright |
| 2008/0136787 A1 | 6/2008 | Yeh et al. |
| 2008/0136792 A1 | 6/2008 | Peng et al. |
| 2008/0158145 A1 | 7/2008 | Westerman |
| 2008/0158146 A1 | 7/2008 | Westerman |
| 2008/0158167 A1 | 7/2008 | Hotelling et al. |
| 2008/0158172 A1 | 7/2008 | Hotelling et al. |
| 2008/0158174 A1 | 7/2008 | Land et al. |
| 2008/0158181 A1 | 7/2008 | Hamblin et al. |
| 2008/0158182 A1 | 7/2008 | Westerman |
| 2008/0158185 A1 | 7/2008 | Westerman |
| 2008/0162996 A1 | 7/2008 | Krah et al. |
| 2008/0188267 A1 | 8/2008 | Sagong |
| 2008/0224962 A1 | 9/2008 | Kasai et al. |
| 2008/0231292 A1 | 9/2008 | Ossart et al. |
| 2008/0238871 A1 | 10/2008 | Tam |
| 2008/0264699 A1 | 10/2008 | Chang et al. |
| 2008/0277259 A1 | 11/2008 | Chang |
| 2008/0283175 A1 | 11/2008 | Hagood et al. |
| 2008/0303022 A1 | 12/2008 | Tai et al. |
| 2008/0303964 A1 | 12/2008 | Lee et al. |
| 2008/0309626 A1 | 12/2008 | Westerman et al. |
| 2008/0309627 A1 | 12/2008 | Hotelling et al. |
| 2008/0309629 A1 | 12/2008 | Westerman et al. |
| 2008/0309632 A1 | 12/2008 | Westerman et al. |
| 2008/0309633 A1 | 12/2008 | Hotelling et al. |
| 2008/0309635 A1 | 12/2008 | Matsuo |
| 2009/0002337 A1 | 1/2009 | Chang |
| 2009/0019344 A1 | 1/2009 | Yoon et al. |
| 2009/0020343 A1 | 1/2009 | Rothkopf et al. |
| 2009/0070681 A1 | 3/2009 | Dawes et al. |
| 2009/0073138 A1 | 3/2009 | Lee et al. |
| 2009/0085894 A1 | 4/2009 | Gandhi et al. |
| 2009/0091551 A1 | 4/2009 | Hotelling et al. |
| 2009/0114456 A1 | 5/2009 | Wisniewski |
| 2009/0128516 A1 | 5/2009 | Rimon et al. |
| 2009/0135157 A1 | 5/2009 | Harley |
| 2009/0160787 A1 | 6/2009 | Westerman et al. |
| 2009/0174676 A1 | 7/2009 | Westerman |
| 2009/0174688 A1 | 7/2009 | Westerman |
| 2009/0182189 A1 | 7/2009 | Lira |
| 2009/0184937 A1 | 7/2009 | Grivna |
| 2009/0194344 A1 | 8/2009 | Harley et al. |
| 2009/0205879 A1 | 8/2009 | Halsey et al. |
| 2009/0213090 A1 | 8/2009 | Mamba et al. |
| 2009/0236151 A1 | 9/2009 | Yeh et al. |
| 2009/0242283 A1 | 10/2009 | Chiu |
| 2009/0251427 A1 | 10/2009 | Hung et al. |
| 2009/0267902 A1 | 10/2009 | Nambu et al. |
| 2009/0267903 A1 | 10/2009 | Cady et al. |
| 2009/0273577 A1 | 11/2009 | Chen et al. |
| 2009/0303189 A1 | 12/2009 | Grunthaner et al. |
| 2009/0309850 A1 | 12/2009 | Yang |
| 2009/0315854 A1 | 12/2009 | Matsuo |
| 2009/0322702 A1 | 12/2009 | Chien et al. |
| 2010/0001973 A1 | 1/2010 | Hotelling et al. |
| 2010/0006350 A1 | 1/2010 | Elias |
| 2010/0007616 A1 | 1/2010 | Jang |
| 2010/0039396 A1 | 2/2010 | Ho et al. |
| 2010/0059294 A1 | 3/2010 | Elias et al. |
| 2010/0060608 A1 | 3/2010 | Yousefpor |
| 2010/0079384 A1 | 4/2010 | Grivna |
| 2010/0079401 A1 | 4/2010 | Staton |
| 2010/0102027 A1 | 4/2010 | Liu et al. |
| 2010/0110035 A1 | 5/2010 | Selker |
| 2010/0117985 A1 | 5/2010 | Wadia |
| 2010/0143848 A1 | 6/2010 | Jain et al. |
| 2010/0156810 A1 | 6/2010 | Barbier et al. |
| 2010/0156846 A1 | 6/2010 | Long et al. |
| 2010/0182278 A1 | 7/2010 | Li et al. |
| 2010/0194697 A1 | 8/2010 | Hotelling et al. |
| 2010/0194707 A1 | 8/2010 | Hotelling et al. |
| 2010/0245286 A1 | 9/2010 | Parker |
| 2010/0253638 A1 | 10/2010 | Yousefpor et al. |
| 2010/0259503 A1 | 10/2010 | Yanase et al. |
| 2010/0328248 A1 | 12/2010 | Mozdzyn |
| 2010/0328263 A1 | 12/2010 | Lin |
| 2011/0006832 A1 | 1/2011 | Land et al. |
| 2011/0007020 A1 | 1/2011 | Hong et al. |
| 2011/0025623 A1 | 2/2011 | Lin |
| 2011/0025629 A1* | 2/2011 | Grivna ............... G06F 3/0446 345/173 |
| 2011/0025635 A1 | 2/2011 | Lee |
| 2011/0074705 A1 | 3/2011 | Yousefpor et al. |
| 2011/0096016 A1 | 4/2011 | Mlmaz |
| 2011/0134050 A1 | 6/2011 | Harley |
| 2011/0157068 A1 | 6/2011 | Parker et al. |
| 2011/0193776 A1 | 8/2011 | Oda et al. |
| 2011/0199105 A1 | 8/2011 | Otagaki et al. |
| 2011/0227874 A1 | 9/2011 | Fahraeus et al. |
| 2011/0231139 A1 | 9/2011 | Yokota et al. |
| 2011/0234523 A1 | 9/2011 | Chang et al. |
| 2011/0234526 A1 | 9/2011 | Mi |
| 2011/0241907 A1 | 10/2011 | Cordeiro |
| 2011/0248949 A1 | 10/2011 | Chang et al. |
| 2011/0254795 A1 | 10/2011 | Chen et al. |
| 2011/0261005 A1 | 10/2011 | Joharapurkar et al. |
| 2011/0261007 A1 | 10/2011 | Joharapurkar et al. |
| 2011/0282606 A1 | 11/2011 | Ahed et al. |
| 2011/0298727 A1 | 12/2011 | Yousefpor et al. |
| 2011/0310033 A1 | 12/2011 | Liu et al. |
| 2011/0310064 A1 | 12/2011 | Keski-Jaskari et al. |
| 2012/0026099 A1 | 2/2012 | Harley |
| 2012/0044199 A1 | 2/2012 | Karpin et al. |
| 2012/0050206 A1 | 3/2012 | Welland |
| 2012/0050214 A1 | 3/2012 | Kremin et al. |
| 2012/0050216 A1 | 3/2012 | Kremin et al. |
| 2012/0050217 A1 | 3/2012 | Noguchi et al. |
| 2012/0054379 A1 | 3/2012 | Leung et al. |
| 2012/0056662 A1 | 3/2012 | Wilson et al. |
| 2012/0056851 A1 | 3/2012 | Chen et al. |
| 2012/0075239 A1 | 3/2012 | Azumi et al. |
| 2012/0092288 A1 | 4/2012 | Wadia |
| 2012/0098776 A1 | 4/2012 | Chen et al. |
| 2012/0113047 A1 | 5/2012 | Hanauer et al. |
| 2012/0146726 A1 | 6/2012 | Huang et al. |
| 2012/0146920 A1 | 6/2012 | Lin et al. |
| 2012/0146942 A1 | 6/2012 | Kamoshida et al. |
| 2012/0154324 A1 | 6/2012 | Wright et al. |
| 2012/0162121 A1 | 6/2012 | Chang et al. |
| 2012/0162133 A1 | 6/2012 | Chen et al. |
| 2012/0162134 A1 | 6/2012 | Chen et al. |

(56) References Cited

U.S. PATENT DOCUMENTS

| | | |
|---|---|---|
| 2012/0169652 A1 | 7/2012 | Chang |
| 2012/0169653 A1 | 7/2012 | Chang |
| 2012/0169655 A1 | 7/2012 | Chang |
| 2012/0169656 A1 | 7/2012 | Chang |
| 2012/0169664 A1 | 7/2012 | Milne |
| 2012/0182251 A1 | 7/2012 | Krah |
| 2012/0211264 A1 | 8/2012 | Milne |
| 2012/0249446 A1 | 10/2012 | Chen et al. |
| 2012/0262395 A1 | 10/2012 | Chan |
| 2012/0313881 A1 | 12/2012 | Ge et al. |
| 2012/0320385 A1 | 12/2012 | Mu et al. |
| 2013/0015868 A1 | 1/2013 | Peng |
| 2013/0021291 A1 | 1/2013 | Kremin et al. |
| 2013/0027118 A1 | 1/2013 | Ho et al. |
| 2013/0027346 A1 | 1/2013 | Yarosh et al. |
| 2013/0038573 A1 | 2/2013 | Chang et al. |
| 2013/0057511 A1 | 3/2013 | Shepelev et al. |
| 2013/0069911 A1 | 3/2013 | You |
| 2013/0076648 A1 | 3/2013 | Krah et al. |
| 2013/0093712 A1 | 4/2013 | Liu et al. |
| 2013/0100038 A1 | 4/2013 | Yilmaz et al. |
| 2013/0100071 A1 | 4/2013 | Wright et al. |
| 2013/0120303 A1 | 5/2013 | Hong et al. |
| 2013/0127739 A1 | 5/2013 | Guard et al. |
| 2013/0141383 A1 | 6/2013 | Woolley |
| 2013/0154996 A1 | 6/2013 | Trend et al. |
| 2013/0173211 A1 | 7/2013 | Hoch et al. |
| 2013/0176271 A1 | 7/2013 | Sobel et al. |
| 2013/0176273 A1 | 7/2013 | Li et al. |
| 2013/0215049 A1 | 8/2013 | Lee |
| 2013/0215075 A1 | 8/2013 | Lee et al. |
| 2013/0224370 A1 | 8/2013 | Cok et al. |
| 2013/0234964 A1 | 9/2013 | Kim et al. |
| 2013/0257785 A1 | 10/2013 | Brown et al. |
| 2013/0257797 A1 | 10/2013 | Wu et al. |
| 2013/0257798 A1 | 10/2013 | Tamura et al. |
| 2013/0265276 A1 | 10/2013 | Obeidat et al. |
| 2013/0278447 A1 | 10/2013 | Kremin |
| 2013/0278498 A1 | 10/2013 | Jung et al. |
| 2013/0278525 A1 | 10/2013 | Lim et al. |
| 2013/0278543 A1 | 10/2013 | Hsu et al. |
| 2013/0307821 A1 | 11/2013 | Kogo |
| 2013/0308031 A1 | 11/2013 | Theuwissen |
| 2013/0314342 A1 | 11/2013 | Kim et al. |
| 2013/0320994 A1 | 12/2013 | Brittain et al. |
| 2013/0321289 A1 | 12/2013 | Dubery et al. |
| 2013/0328759 A1 | 12/2013 | Al-Dahle et al. |
| 2013/0342479 A1 | 12/2013 | Pyo et al. |
| 2014/0002406 A1 | 1/2014 | Cormier, Jr. et al. |
| 2014/0009438 A1 | 1/2014 | Liu et al. |
| 2014/0022186 A1 | 1/2014 | Hong et al. |
| 2014/0022201 A1 | 1/2014 | Boychuk et al. |
| 2014/0043546 A1 | 2/2014 | Yamazaki et al. |
| 2014/0071084 A1 | 3/2014 | Sugiura |
| 2014/0078096 A1 | 3/2014 | Tan et al. |
| 2014/0098051 A1 | 4/2014 | Hong et al. |
| 2014/0104194 A1 | 4/2014 | Davidson et al. |
| 2014/0104225 A1 | 4/2014 | Davidson et al. |
| 2014/0104228 A1 | 4/2014 | Chen et al. |
| 2014/0111707 A1 | 4/2014 | Song et al. |
| 2014/0118270 A1 | 5/2014 | Moses et al. |
| 2014/0125628 A1 | 5/2014 | Yoshida et al. |
| 2014/0132560 A1 | 5/2014 | Huang et al. |
| 2014/0132860 A1 | 5/2014 | Hotelling et al. |
| 2014/0145997 A1 | 5/2014 | Tiruvuru |
| 2014/0152615 A1 | 6/2014 | Chang et al. |
| 2014/0160058 A1 | 6/2014 | Chen et al. |
| 2014/0168540 A1 | 6/2014 | Wang et al. |
| 2014/0192027 A1 | 7/2014 | Ksondzyk et al. |
| 2014/0204058 A1 | 7/2014 | Huang et al. |
| 2014/0210779 A1 | 7/2014 | Katsuta et al. |
| 2014/0232681 A1 | 8/2014 | Yeh |
| 2014/0232955 A1 | 8/2014 | Roudbari et al. |
| 2014/0240291 A1 | 8/2014 | Nam |
| 2014/0247245 A1 | 9/2014 | Lee |
| 2014/0253470 A1 | 9/2014 | Havilio |
| 2014/0267070 A1 | 9/2014 | Shahparnia et al. |
| 2014/0267146 A1 | 9/2014 | Chang et al. |
| 2014/0285469 A1 | 9/2014 | Wright et al. |
| 2014/0306924 A1 | 10/2014 | Lin et al. |
| 2014/0347574 A1 | 11/2014 | Tung et al. |
| 2014/0354301 A1 | 12/2014 | Trend |
| 2014/0362030 A1 | 12/2014 | Mo et al. |
| 2014/0362034 A1 | 12/2014 | Mo et al. |
| 2014/0368436 A1 | 12/2014 | Abzarian et al. |
| 2014/0368460 A1 | 12/2014 | Mo et al. |
| 2014/0375598 A1 | 12/2014 | Shen et al. |
| 2014/0375603 A1 | 12/2014 | Hotelling et al. |
| 2014/0375903 A1 | 12/2014 | Westhues et al. |
| 2015/0002176 A1 | 1/2015 | Kwon et al. |
| 2015/0002448 A1 | 1/2015 | Brunet et al. |
| 2015/0002464 A1 | 1/2015 | Nishioka et al. |
| 2015/0009421 A1 | 1/2015 | Choi et al. |
| 2015/0015528 A1 | 1/2015 | Vandermeijden |
| 2015/0026398 A1 | 1/2015 | Kim |
| 2015/0042600 A1 | 2/2015 | Lukanc et al. |
| 2015/0042607 A1 | 2/2015 | Takanohashi |
| 2015/0049043 A1 | 2/2015 | Yousefpor |
| 2015/0049044 A1* | 2/2015 | Yousefpor ......... G06F 3/041662 345/174 |
| 2015/0062063 A1 | 3/2015 | Cheng et al. |
| 2015/0077375 A1 | 3/2015 | Hotelling et al. |
| 2015/0077394 A1 | 3/2015 | Dai et al. |
| 2015/0091587 A1 | 4/2015 | Shepelev et al. |
| 2015/0091849 A1 | 4/2015 | Ludden |
| 2015/0103047 A1 | 4/2015 | Hanauer et al. |
| 2015/0116263 A1 | 4/2015 | Kim |
| 2015/0123939 A1 | 5/2015 | Kim et al. |
| 2015/0167177 A1 | 6/2015 | Choi |
| 2015/0227240 A1 | 8/2015 | Hong et al. |
| 2015/0242028 A1 | 8/2015 | Roberts et al. |
| 2015/0248177 A1 | 9/2015 | Maharyta |
| 2015/0253907 A1 | 9/2015 | Elias |
| 2015/0268789 A1 | 9/2015 | Liao et al. |
| 2015/0268795 A1 | 9/2015 | Kurasawa et al. |
| 2015/0309610 A1 | 10/2015 | Rabii et al. |
| 2015/0324035 A1 | 11/2015 | Yuan et al. |
| 2015/0338937 A1 | 11/2015 | Shepelev et al. |
| 2015/0370387 A1 | 12/2015 | Yamaguchi et al. |
| 2015/0378465 A1 | 12/2015 | Shih et al. |
| 2016/0018348 A1 | 1/2016 | Yau et al. |
| 2016/0041629 A1 | 2/2016 | Rao et al. |
| 2016/0048234 A1 | 2/2016 | Chandran et al. |
| 2016/0062533 A1 | 3/2016 | O'connor |
| 2016/0077667 A1 | 3/2016 | Chiang et al. |
| 2016/0117032 A1 | 4/2016 | Lin et al. |
| 2016/0139728 A1 | 5/2016 | Jeon et al. |
| 2016/0154505 A1 | 6/2016 | Chang et al. |
| 2016/0154529 A1 | 6/2016 | Westerman |
| 2016/0216808 A1 | 7/2016 | Hotelling et al. |
| 2016/0224177 A1 | 8/2016 | Krah |
| 2016/0224189 A1 | 8/2016 | Yousefpor et al. |
| 2016/0246423 A1 | 8/2016 | Fu |
| 2016/0253041 A1 | 9/2016 | Park et al. |
| 2016/0259448 A1 | 9/2016 | Guarneri |
| 2016/0266676 A1 | 9/2016 | Wang et al. |
| 2016/0266679 A1 | 9/2016 | Shahparnia et al. |
| 2016/0282980 A1 | 9/2016 | Chintalapoodi et al. |
| 2016/0283023 A1 | 9/2016 | Shin et al. |
| 2016/0299603 A1 | 10/2016 | Tsujioka et al. |
| 2016/0357344 A1 | 12/2016 | Benbasat et al. |
| 2017/0060318 A1 | 3/2017 | Gu et al. |
| 2017/0090599 A1 | 3/2017 | Kuboyama et al. |
| 2017/0090619 A1 | 3/2017 | Yousefpor et al. |
| 2017/0097703 A1 | 4/2017 | Lee |
| 2017/0139539 A1 | 5/2017 | Yao et al. |
| 2017/0168626 A1 | 6/2017 | Konicek |
| 2017/0229502 A1 | 8/2017 | Liu et al. |
| 2017/0269729 A1 | 9/2017 | Chintalapoodi |
| 2017/0285804 A1 | 10/2017 | Li et al. |
| 2017/0357371 A1 | 12/2017 | Kim et al. |
| 2018/0067584 A1 | 3/2018 | Zhu et al. |
| 2018/0224962 A1 | 8/2018 | Mori |
| 2018/0275824 A1 | 9/2018 | Li et al. |

(56) References Cited

U.S. PATENT DOCUMENTS

| | | |
|---|---|---|
| 2018/0307374 A1 | 10/2018 | Shah et al. |
| 2018/0307375 A1 | 10/2018 | Shah et al. |
| 2018/0367139 A1 | 12/2018 | Pribisic et al. |
| 2019/0034032 A1 | 1/2019 | Westerman |
| 2019/0138152 A1 | 5/2019 | Yousefpor et al. |
| 2019/0220115 A1 | 7/2019 | Mori et al. |
| 2019/0237963 A1 | 8/2019 | Wuerstlein et al. |
| 2020/0341585 A1 | 10/2020 | Li et al. |
| 2020/0387259 A1 | 12/2020 | Krah |
| 2022/0011920 A1 | 1/2022 | Shorten et al. |

FOREIGN PATENT DOCUMENTS

| | | |
|---|---|---|
| CN | 1672119 A | 9/2005 |
| CN | 1689677 A | 11/2005 |
| CN | 1711520 A | 12/2005 |
| CN | 1782837 A | 6/2006 |
| CN | 1818842 A | 8/2006 |
| CN | 1864124 A | 11/2006 |
| CN | 1945516 A | 4/2007 |
| CN | 101046720 A | 10/2007 |
| CN | 101071354 A | 11/2007 |
| CN | 101122838 A | 2/2008 |
| CN | 101349957 A | 1/2009 |
| CN | 101419516 A | 4/2009 |
| CN | 101840293 A | 9/2010 |
| CN | 102023768 A | 4/2011 |
| CN | 102411460 A | 4/2012 |
| CN | 102782626 A | 11/2012 |
| CN | 102968235 A | 3/2013 |
| CN | 103049148 A | 4/2013 |
| CN | 103052930 A | 4/2013 |
| CN | 103221910 A | 7/2013 |
| CN | 103258492 A | 8/2013 |
| CN | 103294321 A | 9/2013 |
| CN | 103365506 A | 10/2013 |
| CN | 103577008 A | 2/2014 |
| CN | 103809810 A | 5/2014 |
| CN | 103885627 A | 6/2014 |
| CN | 104020908 A | 9/2014 |
| CN | 104142757 A | 11/2014 |
| CN | 104252266 A | 12/2014 |
| CN | 105045446 A | 11/2015 |
| CN | 102648446 B | 1/2016 |
| CN | 105278739 A | 1/2016 |
| CN | 105474154 A | 4/2016 |
| CN | 105824461 A | 8/2016 |
| DE | 112008001245 T5 | 3/2010 |
| EP | 0853230 A1 | 7/1998 |
| EP | 1192585 A1 | 4/2002 |
| EP | 1455264 A2 | 9/2004 |
| EP | 1573706 A2 | 9/2005 |
| EP | 1573706 A3 | 9/2005 |
| EP | 1192585 B1 | 12/2005 |
| EP | 1644918 A2 | 4/2006 |
| EP | 1717677 A2 | 11/2006 |
| EP | 1455264 A3 | 3/2007 |
| EP | 1717677 A3 | 1/2008 |
| EP | 1986084 A1 | 10/2008 |
| EP | 2077489 A1 | 7/2009 |
| EP | 2256606 A2 | 12/2010 |
| EP | 1455264 B1 | 5/2011 |
| EP | 2495643 A2 | 9/2012 |
| GB | 1546317 A | 5/1979 |
| GB | 2144146 A | 2/1985 |
| GB | 2428306 A | 1/2007 |
| GB | 2437827 A | 11/2007 |
| GB | 2450207 A | 12/2008 |
| JP | 2000-163031 A | 6/2000 |
| JP | 2002-342033 A | 11/2002 |
| JP | 2003-66417 A | 3/2003 |
| JP | 2004-503835 A | 2/2004 |
| JP | 2005-84128 A | 3/2005 |
| JP | 2005-301373 A | 10/2005 |
| JP | 2007-18515 A | 1/2007 |
| JP | 2008-510251 A | 4/2008 |
| JP | 2008-225415 | 9/2008 |
| JP | 2010-528186 A | 8/2010 |
| KR | 10-2004-0091728 A | 10/2004 |
| KR | 10-2007-0002327 A | 1/2007 |
| KR | 10-2008-0019125 A | 3/2008 |
| KR | 10-2012-0085737 A | 8/2012 |
| KR | 10-2013-0094495 A | 8/2013 |
| KR | 10-2013-0117499 A | 10/2013 |
| KR | 10-2014-0074454 A | 6/2014 |
| KR | 10-1609992 B1 | 4/2016 |
| TW | 200715015 A | 4/2007 |
| TW | 200826032 A | 6/2008 |
| TW | 200835294 A | 8/2008 |
| TW | M341273 U | 9/2008 |
| TW | M344522 U | 11/2008 |
| TW | M344544 U | 11/2008 |
| TW | M352721 U | 3/2009 |
| TW | 201115442 A | 5/2011 |
| TW | 201203069 A | 1/2012 |
| TW | 201401129 A | 1/2014 |
| TW | 201419071 A | 5/2014 |
| WO | 99/35633 A2 | 7/1999 |
| WO | 99/35633 A3 | 9/1999 |
| WO | 00/73984 A1 | 12/2000 |
| WO | 01/97204 A1 | 12/2001 |
| WO | 02/080637 A1 | 10/2002 |
| WO | 03/079176 A2 | 9/2003 |
| WO | 2004/013833 A2 | 2/2004 |
| WO | 2004/112448 A2 | 12/2004 |
| WO | 2004/114265 A2 | 12/2004 |
| WO | 2005/114369 A2 | 12/2005 |
| WO | 2005/114369 A3 | 1/2006 |
| WO | 2006/020305 A2 | 2/2006 |
| WO | 2006/023147 A2 | 3/2006 |
| WO | 2006/023147 A3 | 5/2006 |
| WO | 2006/104745 A2 | 10/2006 |
| WO | 2006/130584 A2 | 12/2006 |
| WO | 2007/012899 A1 | 2/2007 |
| WO | 2007/034591 A2 | 3/2007 |
| WO | 2006/020305 A3 | 5/2007 |
| WO | 2006/104745 A3 | 5/2007 |
| WO | 2006/130584 A3 | 5/2007 |
| WO | 2007/054018 A1 | 5/2007 |
| WO | 2007/066488 A1 | 6/2007 |
| WO | 2007/089766 A2 | 8/2007 |
| WO | 2007/115032 A2 | 10/2007 |
| WO | 2007/146785 A2 | 12/2007 |
| WO | 2007/115032 A3 | 1/2008 |
| WO | 2008/007118 A2 | 1/2008 |
| WO | 2008/047990 A1 | 4/2008 |
| WO | 2007/146785 A3 | 5/2008 |
| WO | 2008/076237 A2 | 6/2008 |
| WO | 2008/007118 A3 | 8/2008 |
| WO | 2008/076237 A3 | 8/2008 |
| WO | 2007/089766 A3 | 9/2008 |
| WO | 2008/108514 A1 | 9/2008 |
| WO | 2008/135713 A1 | 11/2008 |
| WO | 2009/046363 A1 | 4/2009 |
| WO | 2009/103946 A1 | 8/2009 |
| WO | 2009/132146 A1 | 10/2009 |
| WO | 2009/132150 A1 | 10/2009 |
| WO | 2010/088659 A1 | 8/2010 |
| WO | 2010/117882 A2 | 10/2010 |
| WO | 2011/071784 A1 | 6/2011 |
| WO | 2011/137200 A1 | 11/2011 |
| WO | 2013/158570 A1 | 10/2013 |
| WO | 2014/127716 A1 | 8/2014 |
| WO | 2015/017196 A1 | 2/2015 |
| WO | 2015/023410 A1 | 2/2015 |
| WO | 2015/072722 A1 | 5/2015 |
| WO | 2015/107969 A1 | 7/2015 |
| WO | 2015/178920 A1 | 11/2015 |
| WO | 2016/048269 A1 | 3/2016 |
| WO | 2016/069642 A1 | 5/2016 |
| WO | 2016/126525 A1 | 8/2016 |

(56) References Cited

FOREIGN PATENT DOCUMENTS

| WO | 2016/144437 A1 | 9/2016 |
|---|---|---|
| WO | 2017/058415 A2 | 4/2017 |

OTHER PUBLICATIONS

Advisory Action received for U.S. Appl. No. 11/818,498, dated Oct. 14, 2011, 5 pages.
Advisory Action received for U.S. Appl. No. 12/206,680, dated Apr. 16, 2012, 3 pages.
Advisory Action received for U.S. Appl. No. 12/238,333, dated Dec. 17, 2013, 3 pages.
Advisory Action received for U.S. Appl. No. 12/238,333, dated Oct. 21, 2015, 4 pages.
Advisory Action received for U.S. Appl. No. 12/500,911, dated May 17, 2013, 3 pages.
Advisory Action received for U.S. Appl. No. 12/642,466, dated May 23, 2013, 2 pages.
Advisory Action received for U.S. Appl. No. 14/082,003, dated Mar. 10, 2016, 3 pages.
Advisory Action received for U.S. Appl. No. 14/645,120, dated Nov. 25, 2016, 3 pages.
Advisory Action received for U.S. Appl. No. 15/017,463, dated Aug. 8, 2018, 3 pages.
Extended European Search report received for European Patent Application No. 08022505.5, dated Apr. 25, 2012, 12 pages.
Extended European Search Report received for European Patent Application No. 10151969.2, dated Jul. 21, 2010, 6 pages.
Extended European Search Report received for European Patent Application No. 12162177.5, dated Dec. 3, 2012, 7 pages.
Extended European Search Report received for European Patent Application No. 12192450.0, dated Feb. 13, 2013, 6 pages.
Extended European Search Report received for European Patent Application No. 15166813.4, dated Aug. 31, 2015, 8 pages.
Final Office Action received for U.S. Appl. No. 11/818,498, dated Jan. 3, 2013, 17 pages.
Final Office Action received for U.S. Appl. No. 11/818,498, dated Jun. 10, 2011, 16 pages.
Final Office Action received for U.S. Appl. No. 12/206,680, dated Jan. 5, 2012, 16 pages.
Final Office Action received for U.S. Appl. No. 12/206,680, dated Jan. 27, 2014, 20 pages.
Final Office Action received for U.S. Appl. No. 12/206,680, dated May 22, 2013, 16 pages.
Final Office Action received for U.S. Appl. No. 12/238,333, dated Apr. 22, 2015, 23 pages.
Final Office Action received for U.S. Appl. No. 12/238,333, dated Aug. 12, 2013, 19 pages.
Final Office Action received for U.S. Appl. No. 12/238,342, dated Aug. 13, 2013, 14 pages.
Final Office Action received for U.S. Appl. No. 12/238,342, dated Oct. 22, 2014, 16 pages.
Final Office Action received for U.S. Appl. No. 12/494,173, dated Apr. 30, 2013, 7 pages.
Final Office Action received for U.S. Appl. No. 12/500,911, dated Feb. 5, 2013, 16 pages.
Final Office Action received for U.S. Appl. No. 12/545,604, dated Jul. 16, 2014, 18 pages.
Final Office Action received for U.S. Appl. No. 12/545,604, dated Jul. 19, 2013, 18 pages.
Final Office Action received for U.S. Appl. No. 12/545,754, dated Jun. 21, 2013, 6 pages.
Final Office Action received for U.S. Appl. No. 12/642,466, dated Feb. 1, 2013, 10 pages.
Final Office Action received for U.S. Appl. No. 12/642,466, dated Jan. 29, 2016, 10 pages.
Final Office Action received for U.S. Appl. No. 12/642,466, dated May 9, 2014, 13 pages.
Final Office Action received for U.S. Appl. No. 12/847,987, dated Apr. 23, 2014, 16 pages.
Final Office Action received for U.S. Appl. No. 13/448,182, dated Jun. 11, 2015, 13 pages.
Final Office Action received for U.S. Appl. No. 13/448,182, dated Oct. 22, 2014, 12 pages.
Final Office Action received for U.S. Appl. No. 13/899,391, dated Apr. 8, 2016, 10 pages.
Final Office Action received for U.S. Appl. No. 14/082,003, dated Jan. 4, 2016, 26 pages.
Final Office Action received for U.S. Appl. No. 14/082,003, dated Nov. 4, 2016, 19 pages.
Final Office Action received for U.S. Appl. No. 14/082,074, dated Nov. 12, 2015, 23 pages.
Final Office Action received for U.S. Appl. No. 14/318,157, dated Jul. 26, 2017, 10 pages.
Final Office Action received for U.S. Appl. No. 14/318,157, dated May 9, 2016, 10 pages.
Final Office Action received for U.S. Appl. No. 14/550,686, dated Aug. 21, 2017, 12 pages.
Final Office Action received for U.S. Appl. No. 14/550,686, dated Jun. 14, 2016, 11 pages.
Final Office Action received for U.S. Appl. No. 14/558,529, dated Sep. 29, 2016, 23 pages.
Final Office Action received for U.S. Appl. No. 14/645,120, dated Aug. 10, 2017, 13 pages.
Final Office Action received for U.S. Appl. No. 14/645,120, dated May 27, 2016, 13 pages.
Final Office Action received for U.S. Appl. No. 14/993,017, dated Aug. 16, 2018, 35 pages.
Final Office Action received for U.S. Appl. No. 15/006,987, dated Dec. 5, 2017, 19 pages.
Final Office Action received for U.S. Appl. No. 15/006,987, dated May 14, 2018, 11 pages.
Final Office Action received for U.S. Appl. No. 15/009,774, dated Feb. 6, 2019, 16 pages.
Final Office Action received for U.S. Appl. No. 15/017,463, dated May 17, 2018, 22 pages.
Final Office Action received for U.S. Appl. No. 15/090,555, dated Aug. 29, 2018, 18 pages.
Final Office Action received for U.S. Appl. No. 15/097,179, dated Jul. 27, 2018, 12 pages.
Final Office Action received for U.S. Appl. No. 15/313,549, dated Dec. 18, 2019, 24 pages.
Final Office Action received for U.S. Appl. No. 15/507,722, dated Sep. 13, 2019, 18 pages.
Final Office Action received for U.S. Appl. No. 15/522,737, dated Sep. 12, 2019, 15 pages.
Final Office Action received for U.S. Appl. No. 16/152,326, dated Jan. 27, 2020, 10 pages.
Final Office Action received for U.S. Appl. No. 16/201,730, dated Nov. 1, 2019, 11 pages.
First Action Interview Office Action received for U.S. Appl. No. 15/686,969, dated Aug. 19, 2019, 7 pages.
International Preliminary Report on Patentability received for PCT Patent Application No. PCT/US2010/022868, completed on Jan. 27, 2011, 10 pages.
International Search Report received for PCT Patent Application No. PCT/US2010/022868, dated Mar. 10, 2010, 3 pages.
International Search Report received for PCT Patent Application No. PCT/US2010/029698, dated Jan. 14, 2011, 5 pages.
International Search Report received for PCT Patent Application No. PCT/US2010/058988, dated May 2, 2011, 4 pages.
International Search Report received for PCT Patent Application No. PCT/US2013/036662, dated Aug. 6, 2013, 3 pages.
International Search Report received for PCT Patent Application No. PCT/US2014/047888, dated Jan. 29, 2015, 6 pages.
International Search Report received for PCT Patent Application No. PCT/US2016/015479, dated May 9, 2016, 3 pages.
International Search Report received for PCT Patent Application No. PCT/US2016/016011, dated May 11, 2016, 6 pages.
Non-Final Office Action received for U.S. Appl. No. 11/818,498, dated Dec. 13, 2010, 16 pages.

(56) References Cited

OTHER PUBLICATIONS

Non-Final Office Action received for U.S. Appl. No. 11/818,498, dated May 25, 2012, 17 pages.
Non-Final Office Action received for U.S. Appl. No. 12/206,680, dated Jun. 9, 2011, 14 pages.
Non-Final Office Action received for U.S. Appl. No. 12/206,680, dated Sep. 26, 2012, 14 pages.
Non-Final Office Action received for U.S. Appl. No. 12/206,680, dated Sep. 30, 2013, 19 pages.
Non-Final Office Action received for U.S. Appl. No. 12/238,333, dated Jan. 7, 2013, 21 pages.
Non-Final Office Action received for U.S. Appl. No. 12/238,333, dated May 3, 2012, 24 pages.
Non-Final Office Action received for U.S. Appl. No. 12/238,333, dated Sep. 18, 2014, 22 pages.
Non-Final Office Action received for U.S. Appl. No. 12/238,342, dated Feb. 15, 2013, 18 pages.
Non-Final Office Action received for U.S. Appl. No. 12/238,342, dated Mar. 9, 2012, 27 pages.
Non-Final Office Action received for U.S. Appl. No. 12/238,342, dated Mar. 12, 2014, 17 pages.
Non-Final Office Action received for U.S. Appl. No. 12/494,173, dated Nov. 28, 2012, 7 pages.
Non-Final Office Action received for U.S. Appl. No. 12/500,911, dated Jun. 7, 2012, 17 pages.
Non-Final Office Action received for U.S. Appl. No. 12/545,557, dated Jan. 3, 2014, 10 pages.
Non-Final Office Action received for U.S. Appl. No. 12/545,557, dated Nov. 23, 2012, 11 pages.
Non-Final Office Action received for U.S. Appl. No. 12/545,604, dated Dec. 19, 2013, 17 pages.
Non-Final Office Action received for U.S. Appl. No. 12/545,604, dated Jan. 7, 2013, 13 pages.
Non-Final Office Action received for U.S. Appl. No. 12/545,754, dated Jan. 2, 2014, 12 pages.
Non-Final Office Action received for U.S. Appl. No. 12/545,754, dated Oct. 5, 2012, 10 pages.
Non-Final Office Action received for U.S. Appl. No. 12/545,754, dated Sep. 10, 2013, 6 pages.
Non-Final Office Action received for U.S. Appl. No. 12/642,466, dated Aug. 28, 2012, 10 pages.
Non-Final Office Action received for U.S. Appl. No. 12/642,466, dated May 4, 2015, 10 pages.
Non-Final Office Action received for U.S. Appl. No. 12/642,466, dated Nov. 8, 2013, 13 pages.
Non-Final Office Action received for U.S. Appl. No. 12/847,987, dated Sep. 6, 2013, 16 pages.
Non-Final Office Action received for U.S. Appl. No. 13/448,182, dated Jan. 31, 2014, 18 pages.
Non-Final Office Action received for U.S. Appl. No. 13/737,779, dated Mar. 29, 2013, 10 pages.
Non-Final Office Action received for U.S. Appl. No. 13/899,391, dated Oct. 5, 2015, 11 pages.
Non-Final Office Action received for U.S. Appl. No. 14/055,717, dated Apr. 10, 2014, 11 pages.
Non-Final Office Action received for U.S. Appl. No. 14/082,003, dated Mar. 13, 2017, 21 pages.
Non-Final Office Action received for U.S. Appl. No. 14/082,003, dated May 8, 2015, 26 pages.
Non-Final Office Action received for U.S. Appl. No. 14/082,003, dated May 25, 2016, 23 pages.
Non-Final Office Action received for U.S. Appl. No. 14/082,074, dated Apr. 10, 2015, 24 pages.
Non-Final Office Action received for U.S. Appl. No. 14/318,157, dated Apr. 3, 2018, 12 pages.
Non-Final Office Action received for U.S. Appl. No. 14/318,157, dated Dec. 19, 2016, 11 pages.
Non-Final Office Action received for U.S. Appl. No. 14/318,157, dated Oct. 6, 2015, 8 pages.
Non-Final Office Action received for U.S. Appl. No. 14/550,686, dated Aug. 20, 2015, 11 pages.
Non-Final Office Action received for U.S. Appl. No. 14/550,686, dated Dec. 14, 2016, 8 pages.
Non-Final Office Action received for U.S. Appl. No. 14/558,529, dated Apr. 14, 2016, 21 pages.
Non-Final Office Action received for U.S. Appl. No. 14/558,529, dated Jun. 26, 2017, 6 pages.
Non-Final Office Action received for U.S. Appl. No. 14/615,186, dated Jun. 1, 2016, 9 pages.
Non-Final Office Action received for U.S. Appl. No. 14/645,120, dated Dec. 16, 2016, 11 pages.
Non-Final Office Action received for U.S. Appl. No. 14/645,120, dated Oct. 27, 2015, 9 pages.
Non-Final Office Action received for U.S. Appl. No. 14/993,017, dated Dec. 22, 2017, 24 pages.
Non-Final Office Action received for U.S. Appl. No. 14/993,017, dated Jan. 18, 2019, 35 pages.
Non-Final Office Action received for U.S. Appl. No. 15/006,987, dated Jun. 14, 2017, 14 pages.
Non-Final Office Action received for U.S. Appl. No. 15/009,774, dated Jun. 20, 2018, 19 pages.
Non-Final Office Action received for U.S. Appl. No. 15/009,774, dated Sep. 4, 2019, 18 pages.
Non-Final Office Action received for U.S. Appl. No. 15/017,463, dated May 15, 2019, 20 pages.
Non-Final Office Action received for U.S. Appl. No. 15/017,463, dated Sep. 14, 2017, 22 pages.
Non-Final Office Action received for U.S. Appl. No. 15/087,956, dated Jan. 18, 2019, 13 pages.
Non-Final Office Action received for U.S. Appl. No. 15/097,179, dated Jan. 22, 2018, 12 pages.
Non-Final Office Action received for U.S. Appl. No. 15/144,706, dated Apr. 7, 2017, 8 pages.
Non-Final Office Action received for U.S. Appl. No. 15/313,549, dated Dec. 21, 2018, 14 pages.
Non-Final Office Action received for U.S. Appl. No. 15/313,549, dated Jul. 10, 2019, 25 pages.
Non-Final Office Action received for U.S. Appl. No. 15/507,722, dated Feb. 11, 2019, 16 pages.
Non-Final Office Action received for U.S. Appl. No. 15/522,737, dated Jan. 2, 2019, 14 pages.
Non-Final Office Action received for U.S. Appl. No. 16/152,326, dated Aug. 14, 2019, 12 pages.
Non-Final Office Action received for U.S. Appl. No. 16/201,730, dated May 10, 2019, 9 pages.
Notice of Allowance received for U.S. Appl. No. 12/238,333, dated Dec. 1, 2015, 10 pages.
Notice of Allowance received for U.S. Appl. No. 12/494,173, dated Oct. 15, 2014, 8 pages.
Notice of Allowance received for U.S. Appl. No. 12/500,911, dated Aug. 19, 2013, 7 pages.
Notice of Allowance received for U.S. Appl. No. 12/545,557, dated Apr. 11, 2014, 9 pages.
Notice of Allowance received for U.S. Appl. No. 12/545,557, dated Jun. 10, 2013, 9 pages.
Notice of Allowance received for U.S. Appl. No. 12/545,604, dated Oct. 5, 2015, 9 pages.
Notice of Allowance received for U.S. Appl. No. 12/545,754, dated Aug. 21, 2014, 10 pages.
Notice of Allowance received for U.S. Appl. No. 13/448,182, dated Jan. 8, 2016, 9 pages.
Notice of Allowance received for U.S. Appl. No. 13/737,779, dated Sep. 3, 2013, 11 pages.
Notice of Allowance received for U.S. Appl. No. 14/055,717, dated Nov. 7, 2014, 7 pages.
Notice of Allowance received for U.S. Appl. No. 14/082,003, dated Oct. 3, 2017, 10 pages.
Notice of Allowance received for U.S. Appl. No. 14/082,003, dated Sep. 20, 2017, 9 pages.
Notice of Allowance received for U.S. Appl. No. 14/312,489, dated Mar. 16, 2015, 8 pages.

(56) References Cited

OTHER PUBLICATIONS

Notice of Allowance received for U.S. Appl. No. 14/318,157, dated Dec. 31, 2018, 8 pages.
Notice of Allowance received for U.S. Appl. No. 14/550,686, dated Feb. 9, 2018, 11 pages.
Notice of Allowance received for U.S. Appl. No. 14/558,529, dated Oct. 13, 2017, 8 pages.
Notice of Allowance received for U.S. Appl. No. 14/615,186, dated Dec. 2, 2016, 7 pages.
Notice of Allowance received for U.S. Appl. No. 14/645,120, dated Mar. 1, 2018, 6 pages.
Notice of Allowance received for U.S. Appl. No. 14/993,017, dated Jul. 12, 2019, 10 pages.
Notice of Allowance received for U.S. Appl. No. 15/087,956, dated Mar. 11, 2019, 11 pages.
Notice of Allowance received for U.S. Appl. No. 15/090,555, dated Feb. 12, 2019, 7 pages.
Notice of Allowance received for U.S. Appl. No. 15/144,706, dated Sep. 20, 2017, 9 pages.
Notice of Allowance received for U.S. Appl. No. 15/507,722, dated Feb. 27, 2020, 9 pages.
Notice of Allowance received for U.S. Appl. No. 15/686,969, dated Jan. 2, 2020, 8 pages.
Notice of Allowance received for U.S. Appl. No. 15/687,078, dated Apr. 3, 2019, 9 pages.
Notice of Allowance received for U.S. Appl. No. 15/691,283, dated Jun. 5, 2019, 10 pages.
Office Action received for Australian Patent Application No. 2019200698, dated Nov. 23, 2019, 3 pages.
Office Action received for Chinese Patent Application No. 201480081612.6, dated Jun. 4, 2019, 22 pages (11 of English Translation and 11 pages of Official Copy).
Office Action received for Chinese Patent Application No. 201580058366.7, dated May 28, 2019, 19 pages (10 pages of English Translation and 9 pages of Official Copy).
Office Action received for Chinese Patent Application No. 201680012966.4, dated Nov. 1, 2019, 19 pages (10 pages of English Translation and 9 pages of Official copy).
Office Action received for European Patent Application No. 17183937.6, dated Dec. 16, 2019, 5 pages.
Pre-Interview First Office Action received for U.S. Appl. No. 15/686,969, dated Apr. 4, 2019, 4 pages.
Restriction Requirement received for U.S. Appl. No. 12/238,333, dated Mar. 8, 2012, 6 pages.
Restriction Requirement received for U.S. Appl. No. 12/494,173, dated Aug. 8, 2012, 5 pages.
Restriction Requirement received for U.S. Appl. No. 13/899,391, dated Apr. 8, 2015, 6 pages.
Restriction Requirement received for U.S. Appl. No. 15/087,956, dated Feb. 13, 2018, 8 pages.
Restriction Requirement received for U.S. Appl. No. 15/097,179, dated Sep. 28, 2017, 6 pages.
Restriction Requirement received for U.S. Appl. No. 15/691,283, dated Mar. 5, 2019, 6 pages.
Search Report received for Chinese Patent Application No. 201310042816.6, completed on May 18, 2015, 4 pages (2 pages of English Translation and 2 pages of Official copy).
Search Report received for Chinese Patent Application No. ZL201020108330.X, completed on Dec. 14, 2011, 12 pages (English Translation only).
Search Report received for European Patent Application No. 17183937.6, dated Jan. 31, 2018, 4 pages.
Search Report received for Netherlands Patent Application No. 2001672, dated Apr. 29, 2009, 8 pages.
Search Report received for Taiwanese Patent Application No. 103105965, dated Nov. 12, 2015, 2 pages (1 page of English Translation and 1 page of Official copy).
Search Report received for Taiwanese Patent Application No. 103116003, dated Oct. 14, 2015, 2 pages (1 page of English Translation and 1 page of Official copy).
Search Report received for Taiwanese Patent Application No. 104115152, dated May 3, 2016, 2 pages (1 page of English Translation and 1 page of Official copy).
Supplementary European Search Report received for European Patent Application No. 14902458.0, dated Jul. 27, 2017, 4 pages.
Written Opinion received for PCT Patent Application No. PCT/US2010/022868, dated Mar. 10, 2010, 4 pages.
Cassidy Robin, "The Tissot T-Touch Watch—A Groundbreaking Timepiece", Ezine Articles, Available online at: <http://ezinearticles.com/?The-Tissot-T-Touch-Watch---A-Groundbreaking-Timepiece&id=. . . >, Feb. 23, 2007, 2 pages.
Gibilisco Stan, "The Illustrated Dictionary of Electronics", Eighth Edition, 2001, p. 173.
Lee et al., "A Multi-Touch Three Dimensional Touch-Sensitive Tablet", CHI'85 Proceedings, Apr. 1985, pp. 21-25.
Malik et al., "Visual Touchpad: A Two-Handed Gestural Input Device", Proceedings of the 6th International Conference on Multimodal Interfaces, State College, PA, ICMI '04, ACM, Oct. 13-15, 2004, pp. 289-296.
O'Connor Todd, "mTouch Projected Capacitive Touch Screen Sensing Theory of Operation", Microchip TB3064, Microchip Technology Inc., 2010, pp. 1-16.
Rekimoto J., "SmartSkin: An Infrastructure for Freehand Manipulation on Interactive Surfaces", CHI 2002 Conference Proceedings, Conference on Human Factors in Computing Systems, Minneapolis, vol. 4, No. 1, Apr. 20-25, 2002, pp. 113-120.
Rubine Dean, "Combining Gestures and Direct Manipulation", CHI'92, May 3-7, 1992, pp. 659-660.
Rubine Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Wilson Andrew D., "Robust Computer Vision-Based Detection of Pinching for One and Two-Handed Gesture Input", ACM, USIT '06, Montreux, Oct. 15-18, 2006, 4 pages.
Yang et al., "A Noise-Immune High-Speed Readout Circuit for In-Cell Touch Screen Panels", IEEE Transactions on Circuits and Systems-I: Regular Papers vol. 60, No. 7, Jul. 2013, pp. 1800-1809.
Final Office Action received for U.S. Appl. No. 16/152,326, dated Dec. 4, 2020, 10 pages.
Examiner's Answer to Appeal Brief received for U.S. Appl. No. 11/818,498, dated Dec. 20, 2013, 17 pages.
Extended European Search Report received for European Patent Application No. 18197785.1, dated Apr. 5, 2019, 8 pages.
Final Office Action received for U.S. Appl. No. 15/017,463, dated Feb. 13, 2020, 22 pages.
Non-Final Office Action received for U.S. Appl. No. 15/313,549, dated Apr. 23, 2020, 33 pages.
Non-Final Office Action received for U.S. Appl. No. 16/152,326, dated Jun. 29, 2020, 10 pages.
Notice of Allowance received for U.S. Appl. No. 15/009,774, dated Jul. 1, 2020, 6 pages.
Notice of Allowance received for U.S. Appl. No. 15/009,774, dated Mar. 20, 2020, 16 pages.
Notice of Allowance received for U.S. Appl. No. 15/313,549, dated Oct. 21, 2020, 10 pages.
Notice of Allowance received for U.S. Appl. No. 15/522,737, dated Mar. 6, 2020, 8 pages.
Patent Board Decision received for U.S. Appl. No. 11/818,498, dated Nov. 2, 2016, 8 pages.
Search Report received for Chinese Patent Application No. 201680008313.9, dated Jul. 5, 2019, 4 pages (2 pages English Translation and 2 pages of Official copy).
Supplemental Notice of Allowance received for U.S. Appl. No. 15/686,969, dated Feb. 21, 2020, 2 pages.
Lowe, Doug, "Electronics Components: How to Use an Op Amp as a Voltage Comparator", Dummies, Available online at: <https://

(56) References Cited

OTHER PUBLICATIONS www.dummies.com/programming/electronics/components/electronics-components-how-to-use-an-op-amp-as-a-voltage-comparator/>, 2012, 9 pages.
International Search Report received for PCT Patent Application No. PCT/US2016/048750, dated May 4, 2017, 6 pages.
Non-Final Office Action received for U.S. Appl. No. 16/152,326, dated Apr. 26, 2021, 12 pages.
Non-Final Office Action received for U.S. Appl. No. 16/924,047, dated Sep. 24, 2021, 17 pages.
Non-Final Office Action received for U.S. Appl. No. 17/003,133, dated Aug. 3, 2021, 22 pages.
Notice of Allowability received for U.S. Appl. No. 16/152,326, dated Dec. 10, 2021, 3 pages.
Notice of Allowance received for U.S. Appl. No. 16/152,326, dated Nov. 26, 2021, 9 pages.
Notice of Allowance received for U.S. Appl. No. 17/003,133, dated Feb. 10, 2022, 6 pages.
Search Report received for Chinese Patent Application No. 201910391469.5, dated Jan. 27, 2022, 5 pages (2 pages of English Translation and 3 pages of Official Copy).
Final Office Action received for U.S. Appl. No. 16/924,047, dated Apr. 13, 2022, 15 pages.
Non-Final Office Action received for U.S. Appl. No. 17/448,879, dated Jun. 24, 2022, 19 Pages.
Notice of Allowance received for U.S. Appl. No. 16/924,047, dated Sep. 21, 2022, 7 pages.
Final Office Action received for U.S. Appl. No. 17/448,879, dated Jan. 9, 2023, 19 pages.

\* cited by examiner

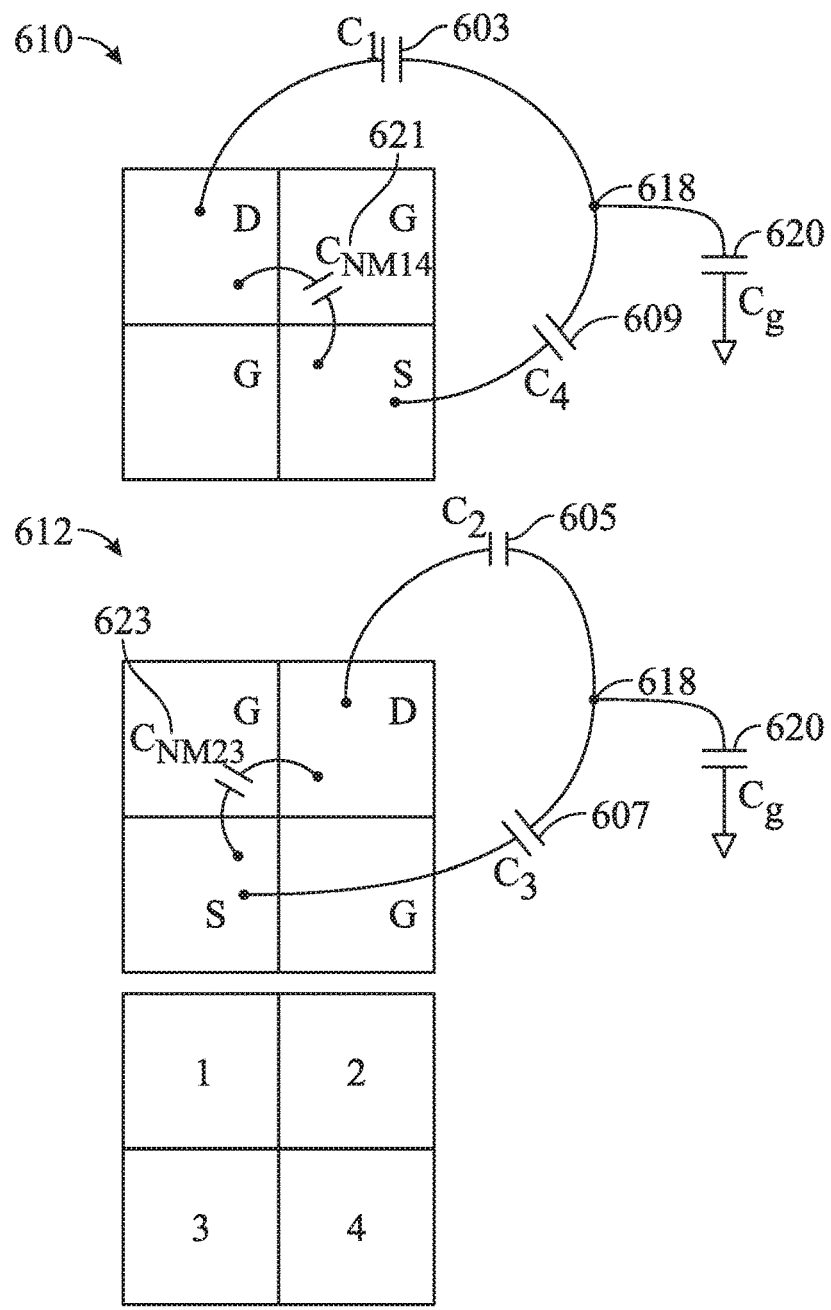
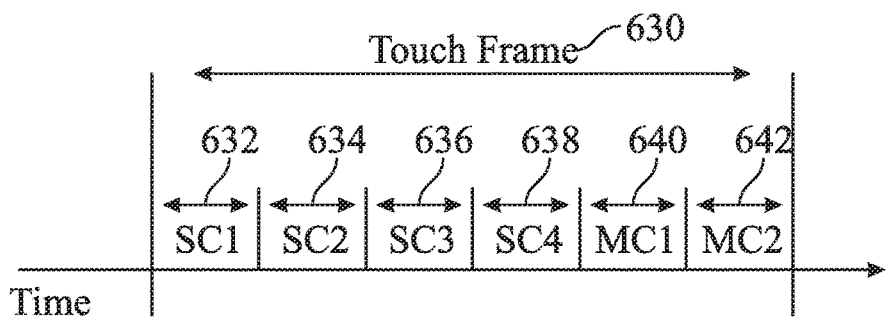
FIG. 6C
FIG. 6D

UNGROUNDED USER SIGNAL COMPENSATION FOR PIXELATED SELF-CAPACITANCE TOUCH SENSOR PANEL

CROSS-REFERENCE TO RELATED APPLICATIONS

This application is a continuation of U.S. patent application Ser. No. 15/507,722, filed Feb. 28, 2017 and published on Oct. 5, 2017 as U.S. Patent Publication No. 2017-0285804, which is a National Phase application under 35 U.S.C. § 371 of International Application No. PCT/US2014/056795, filed Sep. 22, 2014, the contents of which are hereby incorporated by reference in their entirety for all intended purposes.

FIELD OF THE DISCLOSURE

This relates generally to touch sensor panels, and more particularly to compensating touch signals on a partially bootstrapped pixelated self-capacitance touch sensor panel.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of substantially transparent conductive plates made of materials such as Indium Tin Oxide (ITO). It is due in part to their substantial transparency that capacitive touch sensor panels can be overlaid on a display to form a touch screen, as described above. Some touch screens can be formed by partially integrating touch sensing circuitry into a display pixel stackup (i.e., the stacked material layers forming the display pixels).

SUMMARY OF THE DISCLOSURE

Some capacitive touch sensor panels can be formed by a matrix of substantially transparent conductive plates made of materials such as Indium Tin Oxide (ITO), and some touch screens can be formed by partially integrating touch sensing circuitry into a display pixel stackup (i.e., the stacked material layers forming the display pixels). Touch events can be sensed on the touch sensor panels by detecting changes in the self-capacitance of the conductive plates (touch pixels). Sometimes, a touch sensor panel can be a partially bootstrapped touch sensor panel in which some of the touch pixels can be driven and sensed, some of the touch pixels can be driven but not sensed, and some of the touch pixels can be grounded. However, in some examples, a user or object interacting with the touch sensor panel may not be fully grounded, which can cause attenuation of self-capacitance touch signals detected on the touch sensor panel. The examples of the disclosure provide various techniques for reducing the effects of such ungrounded interaction with the touch sensor panel, including with a partially bootstrapped touch sensor panel. In some examples, self-capacitance and mutual capacitance measurements can be obtained on the touch sensor panel, and the self-capacitance measurements can be scaled based on the self- and mutual capacitance measurements to effectively reduce the attenuation of the self-capacitance measurements.

BRIEF DESCRIPTION OF THE DRAWINGS

FIG. 6C illustrates various capacitances associated with the mutual capacitance driving and sensing schemes according to examples of the disclosure.

FIG. 6D illustrates an exemplary touch frame for sensing touch on the touch screen according to examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some capacitive touch sensor panels can be formed by a matrix of substantially transparent conductive plates made of materials such as Indium Tin Oxide (ITO), and some touch screens can be formed by partially integrating touch sensing circuitry into a display pixel stackup (i.e., the stacked material layers forming the display pixels). Touch events can be sensed on the touch sensor panels by detecting changes in the self-capacitance of the conductive plates (touch pixels). Sometimes, a touch sensor panel can be a partially bootstrapped touch sensor panel in which some of the touch pixels can be driven and sensed, some of the touch pixels can be driven but not sensed, and some of the touch pixels can be grounded. However, in some examples, a user or object interacting with the touch sensor panel may not be fully grounded, which can cause attenuation of self-capacitance touch signals detected on the touch sensor panel. The examples of the disclosure provide various techniques for reducing the effects of such ungrounded interaction with the touch sensor panel, including with a partially bootstrapped touch sensor panel. In some examples, self-capacitance and mutual capacitance measurements can be obtained on the touch sensor panel, and the self-capacitance measurements can be scaled based on the self- and mutual capacitance measurements to effectively reduce the attenuation of the self-capacitance measurements.

Figure 1:
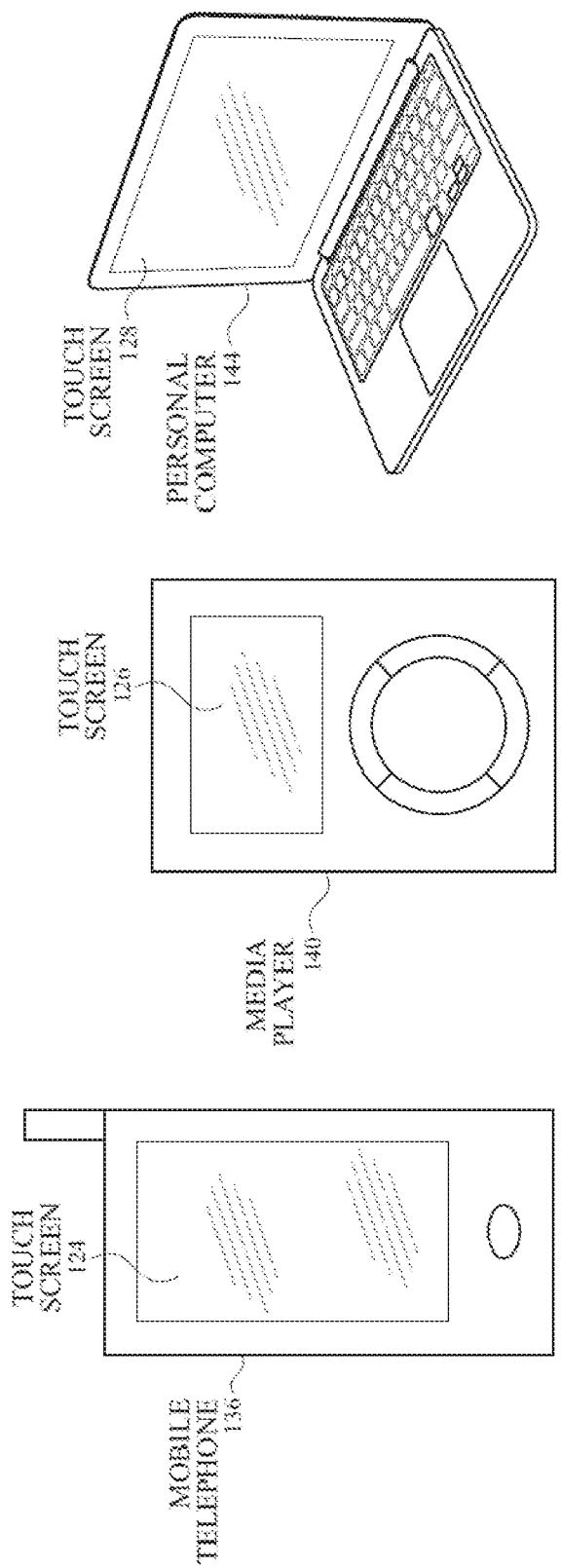
FIGS. 1A-1C illustrate an example mobile telephone, an example media player, and an example portable computing device that can each include an exemplary touch screen according to examples of the disclosure.

FIGS. 1A-1C show example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example portable computing device 144 that includes a touch screen 128. It is understood that the above touch screens can be implemented in other devices as well, including in wearable devices.

In some examples, touch screens 124, 126 and 128 can be based on self-capacitance. A self-capacitance based touch system can include a matrix of small plates of conductive material that can be referred to as a touch pixel or a touch pixel electrode. For example, a touch screen can include a plurality of touch pixels, each touch pixel corresponding to a particular location on the touch screen at which touch or proximity (i.e., a touch or proximity event) is to be sensed. Such a touch screen can be referred to as a pixelated self-capacitance touch screen. During operation, the touch pixel can be stimulated with an AC waveform, and the self-capacitance of the touch pixel can be measured. As an object approaches the touch pixel, the self-capacitance of the touch pixel can change. This change in the self-capacitance of the touch pixel can be detected and measured by the touch sensing system to determine the positions of multiple objects when they touch, or come in proximity to, the touch screen.

Figure 2:
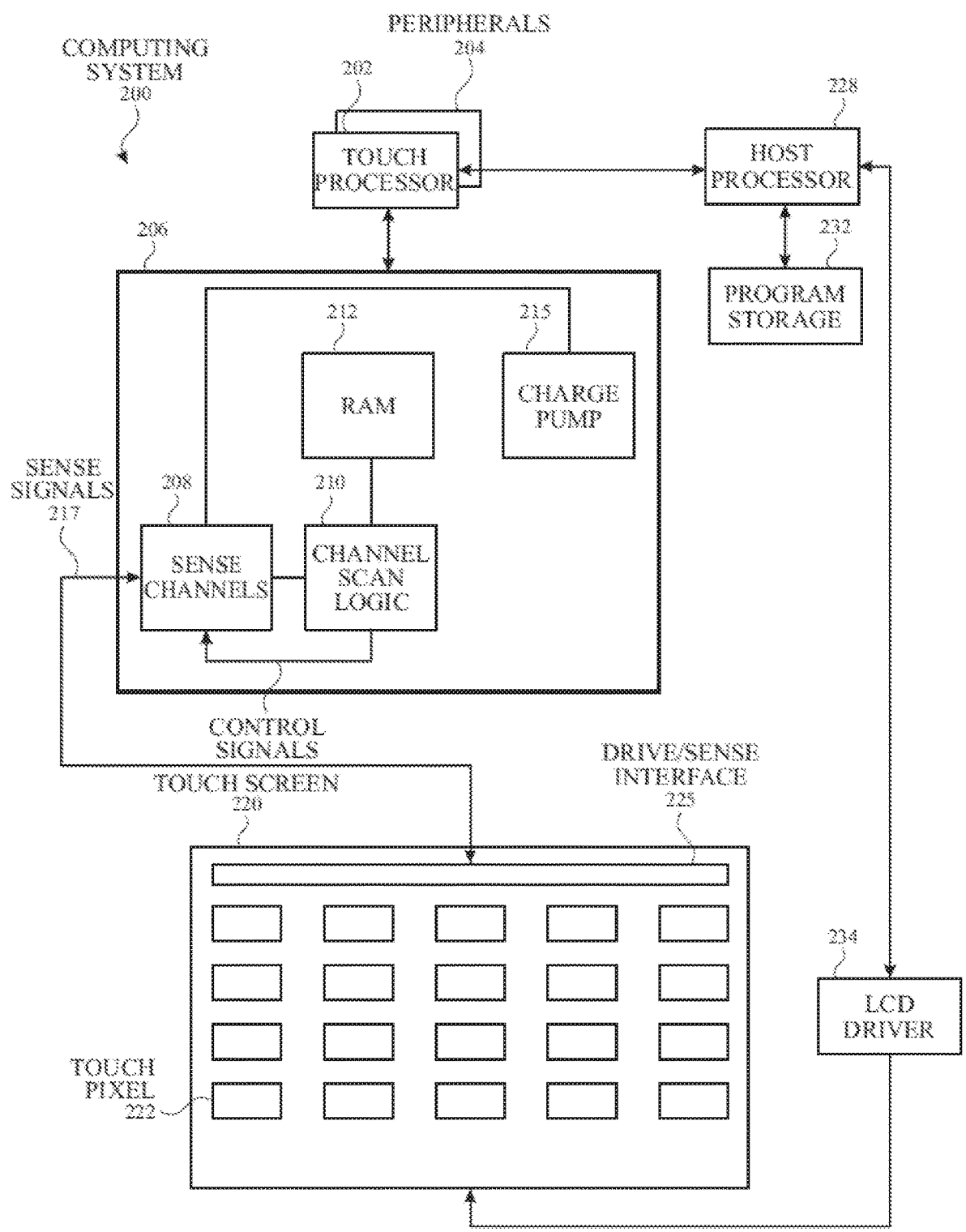
FIG. 2 is a block diagram of an example computing system that illustrates one implementation of an example touch screen according to examples of the disclosure.

FIG. 2 is a block diagram of an example computing system 200 that illustrates one implementation of an example touch screen 220 according to examples of the disclosure. Computing system 200 can be included in, for example, mobile telephone 136, digital media player 140, portable computing device 144, or any mobile or non-mobile computing device that includes a touch screen, including a wearable device. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In addition, channel scan logic 210 can control sense channels 208 to generate stimulation signals at various frequencies and phases that can be selectively applied to the touch pixels of touch screen 220, as described in more detail below. In some examples, touch controller 206, touch processor 202 and peripherals 204 can be integrated into a single application specific integrated circuit (ASIC), and in some examples can be integrated with touch screen 220 itself.

Touch screen 220 can be a self-capacitance touch screen, and can include touch sensing circuitry that can include a capacitive sensing medium having a plurality of touch pixels 222 (e.g., a pixelated self-capacitance touch screen). Touch pixels 222 can be coupled to sense channels 208 in touch controller 206, can be driven by stimulation signals from the sense channels through drive/sense interface 225, and can be sensed by the sense channels through the drive/sense interface as well, as described above. Labeling the conductive plates used to detect touch (i.e., touch pixels 222) as "touch pixels" can be particularly useful when touch screen 220 is viewed as capturing an "image" of touch. In other words, after touch controller 206 has determined an amount of touch detected at each touch pixel 222 in touch screen 220, the pattern of touch pixels in the touch screen at which a touch occurred can be thought of as an "image" of touch (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as an LCD driver 234. The LCD driver 234 can provide voltages on select (gate) lines to each pixel transistor and can provide data signals along data lines to these same transistors to control the pixel display image as described in more detail below. Host processor 228 can use LCD driver 234 to generate an image on touch screen 220, such as an image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including the configuration and operation of electrodes and sense channels, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3A:
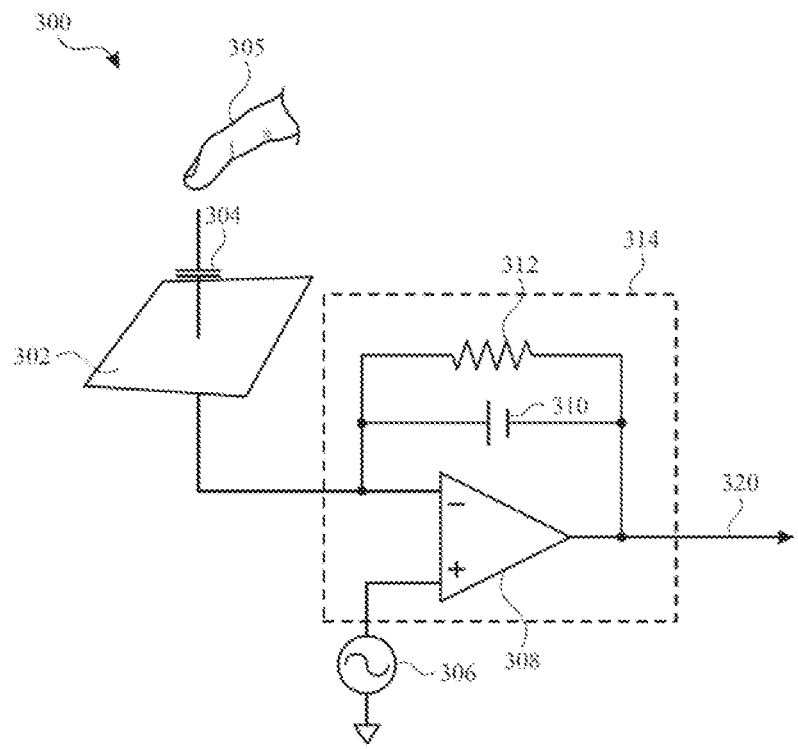
FIG. 3A illustrates an exemplary touch sensor circuit corresponding to a self-capacitance touch pixel electrode and sensing circuit according to examples of the disclosure.

FIG. 3A illustrates an exemplary touch sensor circuit 300 corresponding to a self-capacitance touch pixel electrode 302 and sensing circuit 314 according to examples of the disclosure. Touch pixel electrode 302 can correspond to touch pixel 222. Touch pixel electrode 302 can have an inherent self-capacitance to ground associated with it, and also an additional self-capacitance to ground that is formed when an object, such as finger 305, is in proximity to or touching the electrode. The total self-capacitance to ground of touch pixel electrode 302 can be illustrated as capacitance 304. Touch pixel electrode 302 can be coupled to sensing circuit 314 (which can correspond to sense channels 208). Sensing circuit 314 can include an operational amplifier 308, feedback resistor 312, feedback capacitor 310 and an input voltage source 306, although other configurations can be employed. For example, feedback resistor 312 can be replaced by a switched capacitor resistor in order to minimize any parasitic capacitance effect caused by a variable feedback resistor. Touch pixel electrode 302 can be coupled to the inverting input of operational amplifier 308. An AC voltage source 306 (Vac) can be coupled to the non-inverting input of operational amplifier 308. Touch sensor circuit 300 can be configured to sense changes in the total self-capacitance 304 of the touch pixel electrode 302 induced by a finger or object either touching or in proximity to the touch sensor panel. Output 320 can be used by a processor (e.g., touch controller 206) to determine the presence of a touch event, or the output can be inputted into a discrete logic network to determine the presence of a touch or proximity event. It is understood that a "touch event," as used in this disclosure, encompasses a finger or object touching the touch sensor panel (i.e., being in physical contact with the touch sensor panel), as well as the finger or object being in proximity to, but not touching, the touch sensor panel (e.g., hovering over the touch sensor panel). Touch sensor circuit 300 can represent the structure and/or operation of touch pixel sensing of the examples of the disclosure.

Figure 3B:
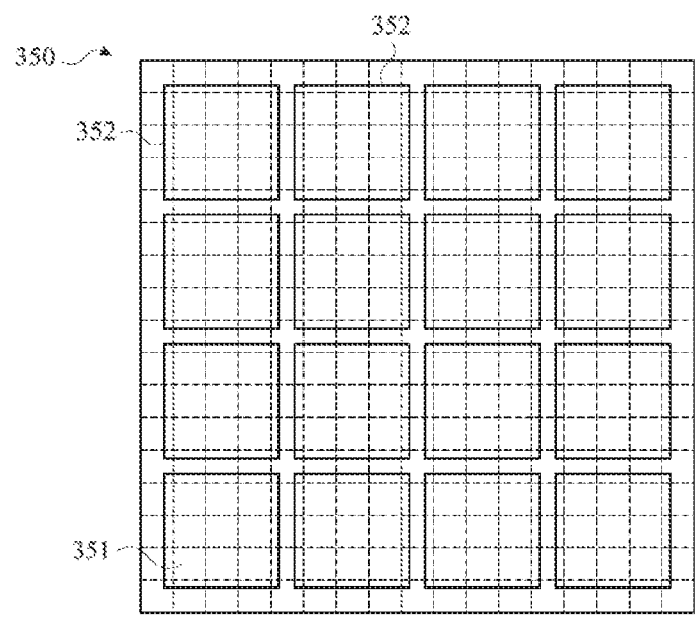
FIG. 3B illustrates an example configuration in which common electrodes can form portions of the touch sensing circuitry of a touch sensing system according to examples of the disclosure.

In some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays (e.g., OLED displays), such as one or more pixel transistors (e.g., thin film transistors (TFTs)), gate lines, data lines, pixel electrodes and common electrodes. In any given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor. FIG. 3B illustrates an example configuration in which common electrodes 352 can form portions of the touch sensing circuitry of a touch sensing system—in some examples of this disclosure, the common electrodes can form touch pixels used to detect an image of touch on touch screen 350, as described above. Each common electrode 352 (i.e., touch pixel) can include a plurality of display pixels 351, and each display pixel 351 can include a portion of a common electrode 352, which can be a circuit element of the display system circuitry in the display pixel stackup (i.e., the stacked material layers forming the display pixels) of the display pixels of some types of LCD or other displays that can operate as part of the display system to display an image.

In the example shown in FIG. 3B, each common electrode 352 can serve as a multi-function circuit element that can operate as display circuitry of the display system of touch screen 350 and can also operate as touch sensing circuitry of the touch sensing system. In this example, each common electrode 352 can operate as a common electrode of the display circuitry of the touch screen 350, as described above, and can also operate as touch sensing circuitry of the touch screen. For example, a common electrode 352 can operate as a capacitive part of a touch pixel of the touch sensing circuitry during the touch sensing phase. Other circuit elements of touch screen 350 can form part of the touch sensing circuitry by, for example, switching electrical connections, etc. More specifically, in some examples, during the touch sensing phase, a gate line can be connected to a power supply, such as a charge pump, that can apply a voltage to maintain TFTs in display pixels included in a touch pixel in an "off" state. Stimulation signals can be applied to common electrode 352. Changes in the total self-capacitance of common electrode 352 can be sensed through an operational amplifier, as previously discussed. The change in the total self-capacitance of common electrode 352 can depend on the proximity of a touch object, such as a finger, to the common electrode. In this way, the measured change in total self-capacitance of common electrode 352 can provide an indication of touch on or near the touch screen.

In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some examples, some of the circuit elements in the display pixel stackups can be multi-function circuit elements and other circuit elements may be single-function circuit elements. In other examples, all of the circuit elements of the display pixel stackups may be single-function circuit elements.

In addition, although examples herein may describe the display circuitry as operating during a display phase, and describe the touch sensing circuitry as operating during a touch sensing phase, it should be understood that a display phase and a touch sensing phase may be operated at the same time, e.g., partially or completely overlap, or the display phase and touch sensing phase may operate at different times. Also, although examples herein describe certain circuit elements as being multi-function and other circuit elements as being single-function, it should be understood that the circuit elements are not limited to the particular functionality in other examples. In other words, a circuit element that is described in one example herein as a single-function circuit element may be configured as a multi-function circuit element in other examples, and vice versa.

The common electrodes 352 (i.e., touch pixels) and display pixels 351 of FIG. 3B are shown as rectangular or square regions on touch screen 350. However, it is understood that the common electrodes 352 and display pixels 351 are not limited to the shapes, orientations, and positions shown, but can include any suitable configurations according to examples of the disclosure.

While the discussion in this disclosure focuses on touch screens, it is understood that some or all of the examples of the disclosure can similarly be implemented in a touch sensor panel (i.e., a panel having touch sensing circuitry without display circuitry). For brevity, however, the examples of the disclosure have been, and will be, described in the context of a touch screen.

In self-capacitance touch screens, any capacitance seen by a self-capacitance touch pixel can affect the total self-capacitance measured at that touch pixel, and can thus affect touch measurements at that touch pixel. Therefore, in some examples, it can be beneficial to "bootstrap" the touch screen in order to reduce or cancel any unwanted capacitances that may contribute to the total self-capacitance measured at a touch pixel. "Bootstrapping" the touch screen can entail driving one or more portions of a touch screen with a voltage at the same frequency and phase as is used to drive and sense a touch pixel (as described above), so that capacitances that may exist between the touch pixel and the one or more portions of the touch screen can be effectively canceled.

Figure 4A:
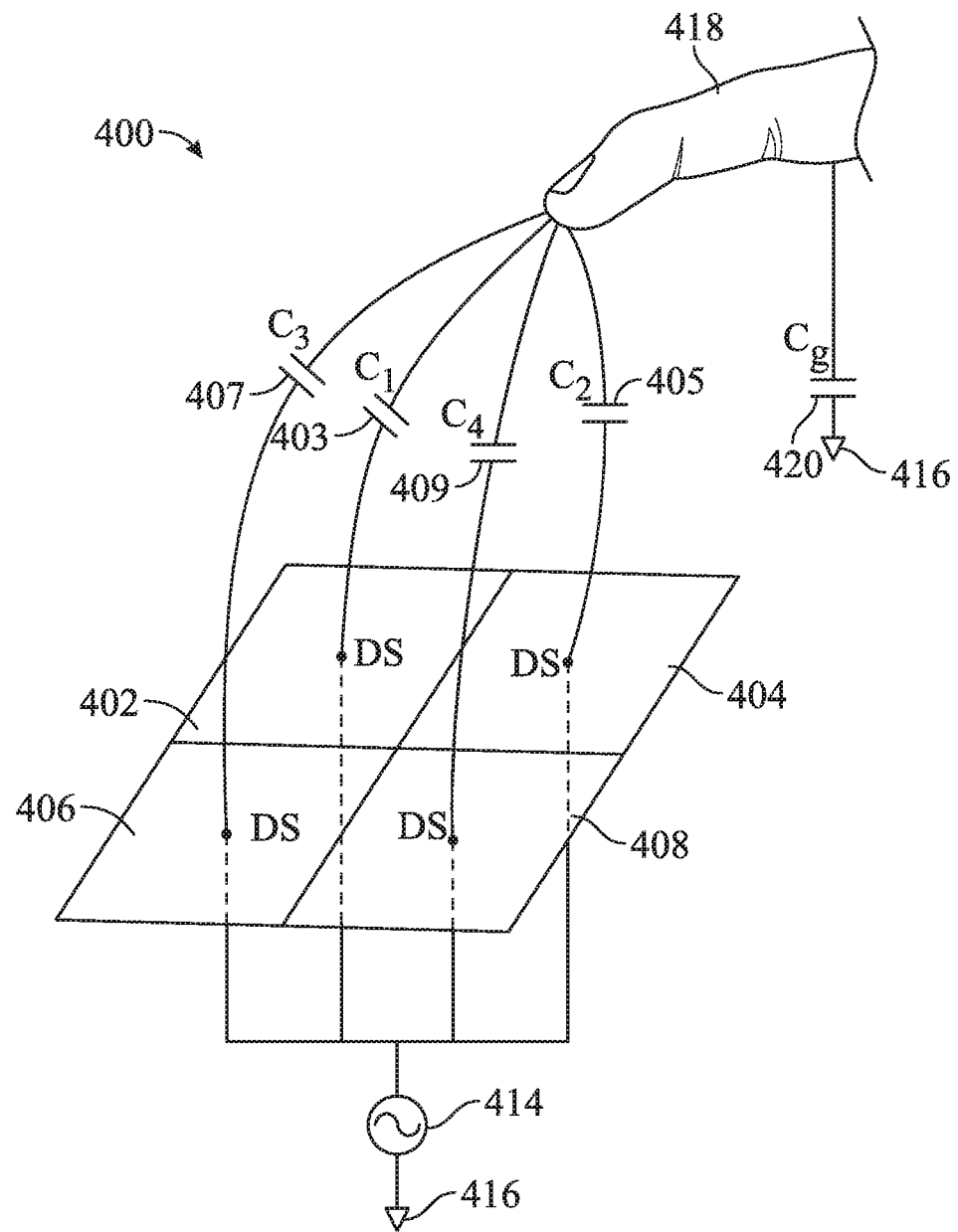
FIG. 4A illustrates an exemplary fully bootstrapped touch screen in which every touch pixel can be driven and sensed simultaneously according to examples of the disclosure.

FIG. 4A illustrates an exemplary fully bootstrapped touch screen 400 in which every touch pixel can be driven and sensed simultaneously. Touch screen 400 can include touch pixels 402, 404, 406 and 408. Touch pixels 402, 404, 406 and 408 can be a portion of the touch pixels that can be included in touch screen 400. Other touch pixels are omitted for ease of description, but it is understood that the scope of the disclosure includes touch screens that include more than four touch pixels.

Each of touch pixels 402, 404, 406 and 408 can be driven and sensed (signified by "DS") simultaneously (or driven simultaneously and sensed sequentially) with the same stimulation signal from stimulation source 414, which can be coupled to the system ground 416 of whichever device touch screen 400 can be included in (e.g., any of the devices illustrated in FIGS. 1A-1C). Stimulation source 414 can correspond to sensing circuit 314 and/or voltage source 306 in FIG. 3A. Although touch pixels 402, 404, 406 and 408 are illustrated as being coupled to the same stimulation source 414, it is understood that substantially the same result can be obtained if the touch pixels were coupled to any combination of different stimulation sources that provide the same stimulation signals. Because each of touch pixels 402, 404, 406 and 408 can be driven and sensed simultaneously (or driven simultaneously and sensed sequentially) with the same stimulation signal, capacitances that may exist between the touch pixels can be effectively canceled, and the sensed total self-capacitances of the touch pixels can be limited to the capacitances that can exist between the touch pixels and finger (or object) 418, and potentially other capacitances (e.g., parasitic capacitances) that may exist between the touch pixels and other system components (e.g., system ground). These capacitances can be represented by C1 403, C2 405, C3 407 and C4 409.

Finger 418 can have capacitance $C_{body}$ between it and earth ground, where $C_{body}$ can represent a human body to earth ground capacitance, for example. Finger 418 can also have capacitance $C_{F\text{-}SG}$ between it and the device in which touch screen 400 can be included, where $C_{F\text{-}SG}$ can represent a finger-to-system (device) ground capacitance. The device in which touch screen 400 can be included can have capacitance $C_{SG\text{-}EG}$ between it and earth ground, where $C_{SG\text{-}EG}$ can represent a system (device) ground-to-earth ground capacitance. In some examples, $C_{body}$ can be much larger than $C_{F\text{-}SG}$ and $C_{SG\text{-}EG}$. Thus, finger 418 can be considered to be effectively shorted to earth ground through $C_{body}$. Therefore, $C_{SG\text{-}EG}$ can be considered to be between system (device) ground and finger 418 (which can be shorted to earth ground); and, from before, $C_{F\text{-}SG}$ can be another capacitance between system (device) ground and finger 418. As a result, $C_{F\text{-}SG}$ and $C_{SG\text{-}EG}$ can be parallel capacitances that can exist between finger 418 and system ground 416. $C_g$ 420, a total capacitance between finger 418 and system ground, can then be expressed as:

$$C_g = C_{F\text{-}SG} C_{SG\text{-}EG} \tag{1}$$

Current from touch pixels 402, 404, 406 and 408 can flow through finger 418 and $C_g$ 420 to system ground 416. However, because an impedance associated with $C_g$ 420 can at least partially isolate finger 418 from system ground 416, the voltage at finger 418 can move further and further away from system ground 416 as more current flows from touch pixels 402, 404, 406 and 408 through finger 418 to system ground 416. Because each of touch pixels 402, 404, 406 and 408 can be driven and sensed simultaneously, current from all four touch pixels can flow through finger 418 to system ground 422. As a result, the voltage at finger 418 can be relatively high with respect to system ground, and relatively little voltage can be dropped across $C_1$ 403, $C_2$ 405, $C_3$ 407 and $C_4$ 409—this can result in an reduction of charge coupling and attenuation of the capacitance sensed at each of the touch pixels associated with capacitances $C_1$, $C_2$, $C_3$ and $C_4$. This attenuation can be reflected in an attenuation factor by which the full $C_1$ 403, $C_2$ 405, $C_3$ 407 and $C_4$ 409 capacitances can be multiplied, which can be expressed as:

$$\alpha = C_g/C_{Total} \quad (2)$$

where $\alpha$ can represent the attenuation factor, and:

$$C_{Total} = C_g + C_1 + C_2 + C_3 + C_4 \quad (3)$$

Thus, the effective self-capacitance sensed at any one touch pixel can be expressed as:

$$C_{Eff,X} = \alpha * C_X \quad (4)$$

where $C_X$ can be $C_1$ 403, $C_2$ 405, $C_3$ 407 or $C_4$ 409. This attenuation of the sensed self-capacitance of the touch pixels can make it difficult to sense touch on touch screen 400. In examples in which touch screen 400 includes more touch pixels that are all being driven and sensed simultaneously, and in which many parts of a user's hand (or other object) are in proximity to/touching the touch screen (e.g., the user's palm, thumb and many fingers touching the touch screen), the attenuation factor $\alpha$ can be as low as 4%. Detecting touch with so much touch signal attenuation can be difficult. In some examples, the amount of touch signal attenuation that can be exhibited can be reduced by partially, rather than fully, bootstrapping the touch screen.

Figure 4B:
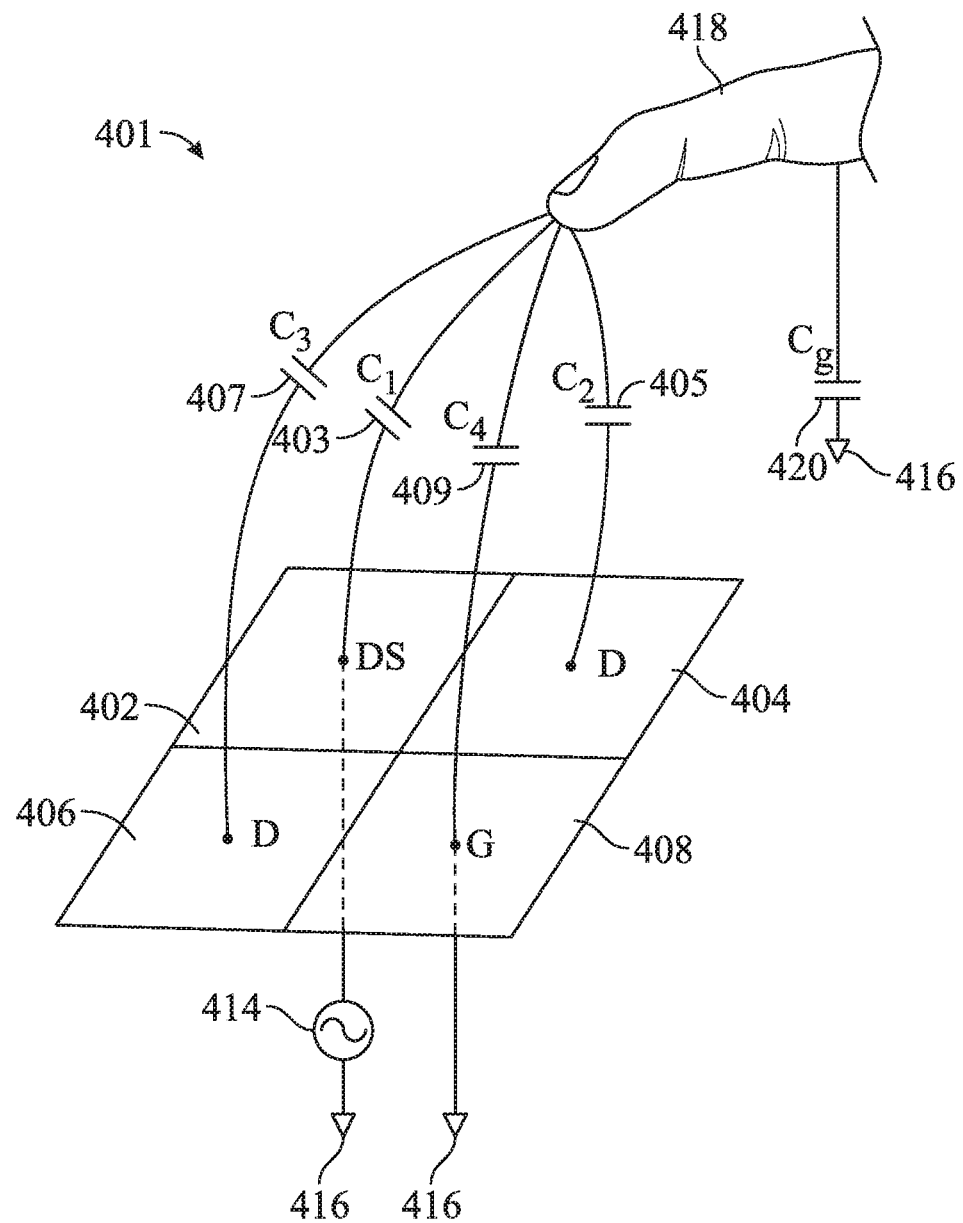
FIG. 4B illustrates an exemplary partially bootstrapped touch screen in which less than all of the touch pixels can be driven and sensed simultaneously according to examples of the disclosure.

FIG. 4B illustrates an exemplary partially bootstrapped touch screen 401 in which less than all of the touch pixels can be driven and sensed simultaneously. Touch screen 401 can be the same as touch screen 400, except that instead of all of touch pixels 402, 404, 406 and 408 being driven and sensed simultaneously as in touch screen 400, only touch pixel 402 can be driven and sensed in touch screen 401. Touch pixels 404 and 406 can be driven but not sensed, and touch pixel 408 can be grounded to system ground 416. Though not illustrated for clarity, touch pixels 404 and 406 can be coupled to a stimulation source to be driven by the same stimulation signal as can be driving touch pixel 402. Additionally, it is understood that in touch screens that have more touch pixels than those illustrated in FIG. 4B, the DS, D and G touch pixel pattern can be repeated across some or all of the touch screen in accordance with the examples of the disclosure.

Partially bootstrapped touch screen 401 can exhibit most if not all of the benefits of fully bootstrapped touch screen 400. Specifically, capacitances between touch pixel 402 (the touch pixel of interest—i.e., the touch pixel for which the total self-capacitance is being sensed) and touch pixels 404 and 406 can continue to be effectively canceled, because touch pixels 402, 404 and 406 can be driven with the same stimulation signal. Capacitances between touch pixel 402 and touch pixel 408 may not be canceled because touch pixel 408 can be coupled to system ground 416; however, because touch pixels 402 and 408 can be diagonally disposed with respect to one another, any capacitances that may exist between the two can be relatively small. Therefore, the total self-capacitance sensed at touch pixel 402 can be substantially free of capacitances that may exist between touch pixel 402 and the other touch pixels, which can be one benefit of a fully bootstrapped touch screen.

Partially bootstrapped touch screen 401 can also exhibit less touch signal attenuation than fully bootstrapped touch screen 400. Whereas in touch screen 400 the only current path from the touch pixels to ground could be through finger 418 and $C_g$ 420, in touch screen 401, the current from the touch pixels to ground can flow through $C_4$ 409 to system ground 416 as well as through finger 418 and $C_g$ 420. Therefore, the voltage at finger 418 can be brought down closer to system ground 416, which can result in more voltage being dropped across $C_1$ 403 than in touch screen 400; thus, more charge coupling and less attenuation of $C_1$ 403 can be sensed at touch pixel 402. The partially bootstrapped touch screen attenuation factor can be expressed as:

$$\alpha = (C_g + C_4)/C_{Total} \quad (5)$$

Similar to before, the effective self-capacitance sensed at touch pixel 402 can be expressed as:

$$C_{Eff,1} = \alpha * C_1 \quad (6)$$

In examples in which touch screen 401 includes more touch pixels that are being driven, sensed, and grounded in the illustrated pattern, and in which many parts of a user's hand are in proximity to/touching the touch screen (e.g., the user's palm, thumb and many fingers touching the touch screen), the attenuation factor can be increased from 4% in the fully bootstrapped touch screen to ~25% in the partially bootstrapped touch screen. This increase can result from the additional $C_4$ term that can be included in the numerator of equation (5), and can relax a signal-to-noise requirement of the touch screen sensing circuitry by more than six times as compared with touch screen 400, which can ease the difficulty of sensing touch on the touch screen.

Figure 5A:
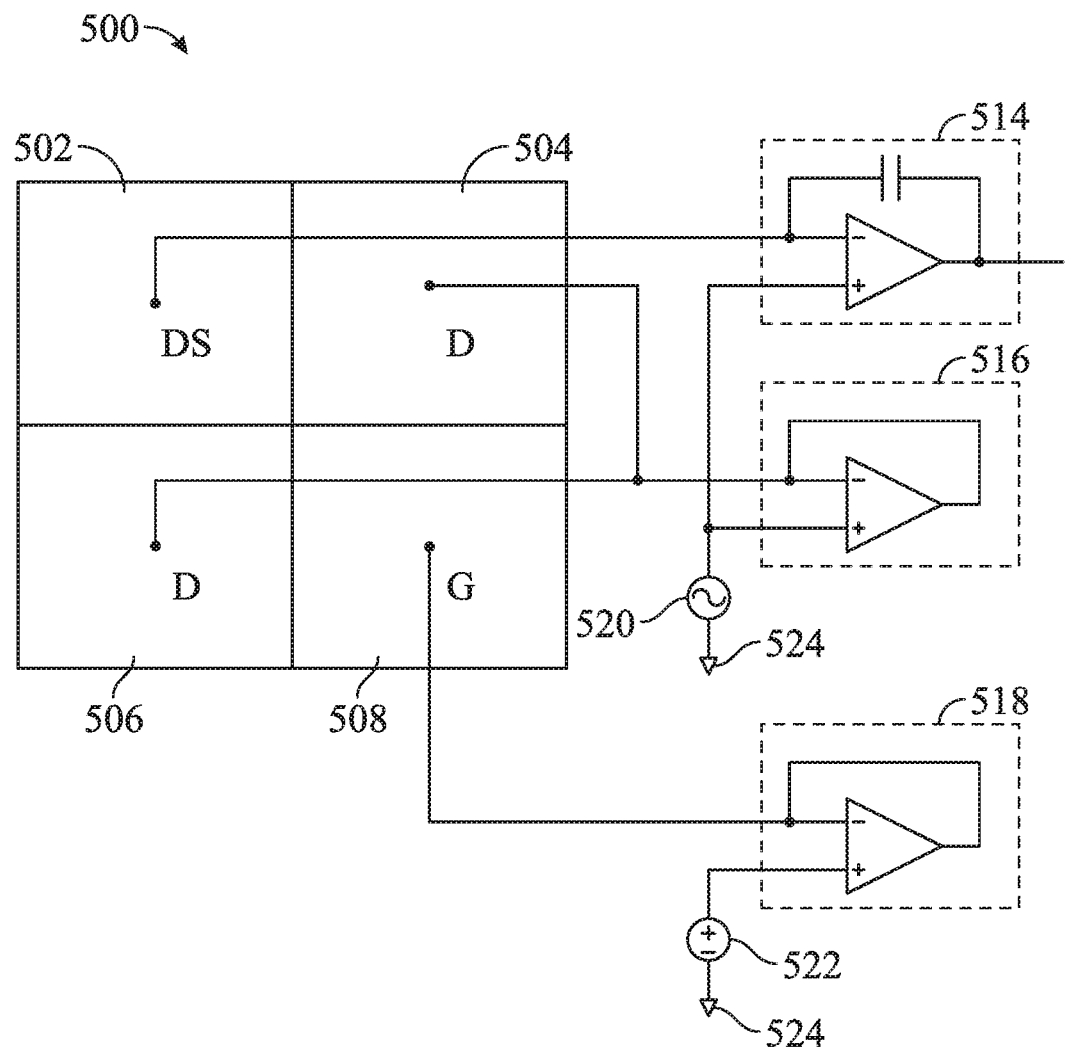
FIG. 5A illustrates an exemplary configuration of a partially bootstrapped touch screen having touch pixels coupled to appropriate circuitry according to examples of the disclosure.

FIG. 5A illustrates an exemplary configuration of partially bootstrapped touch screen 500 having touch pixels coupled to appropriate circuitry. Touch screen 500 can be substantially the same as touch screen 401. Touch pixel 502, which can be driven and sensed, can be coupled to sense circuitry 514. Sense circuitry 514 can correspond to sense circuitry 314 in FIG. 3A, for example. Touch pixels 504 and 506, which can be driven but not sensed, can be coupled to stimulation buffer 516. In some examples, sense circuitry 514 and stimulation buffer 516 can share stimulation source 520, because touch pixels 502, 504 and 506 can be driven by the same stimulation signal; it is understood, however, that the sense circuitry and the stimulation buffer need not necessarily share the same stimulation source. Touch pixel 508, which can be grounded, can be coupled to AC ground buffer 518. Voltage source 522 can provide a DC bias to the AC ground provided by AC ground buffer 518. In some examples, sense circuitry 514, stimulation buffer 516 and/or AC ground buffer 518 can be included in touch controller 206, and in some examples, in sense channels 208. Further, sense circuitry 514, stimulation buffer 516 and/or AC ground buffer 518 are provided as examples only, and it is understood that other circuitry can be utilized to similarly drive, sense and ground the touch pixels of the disclosure.

Figure 5B:
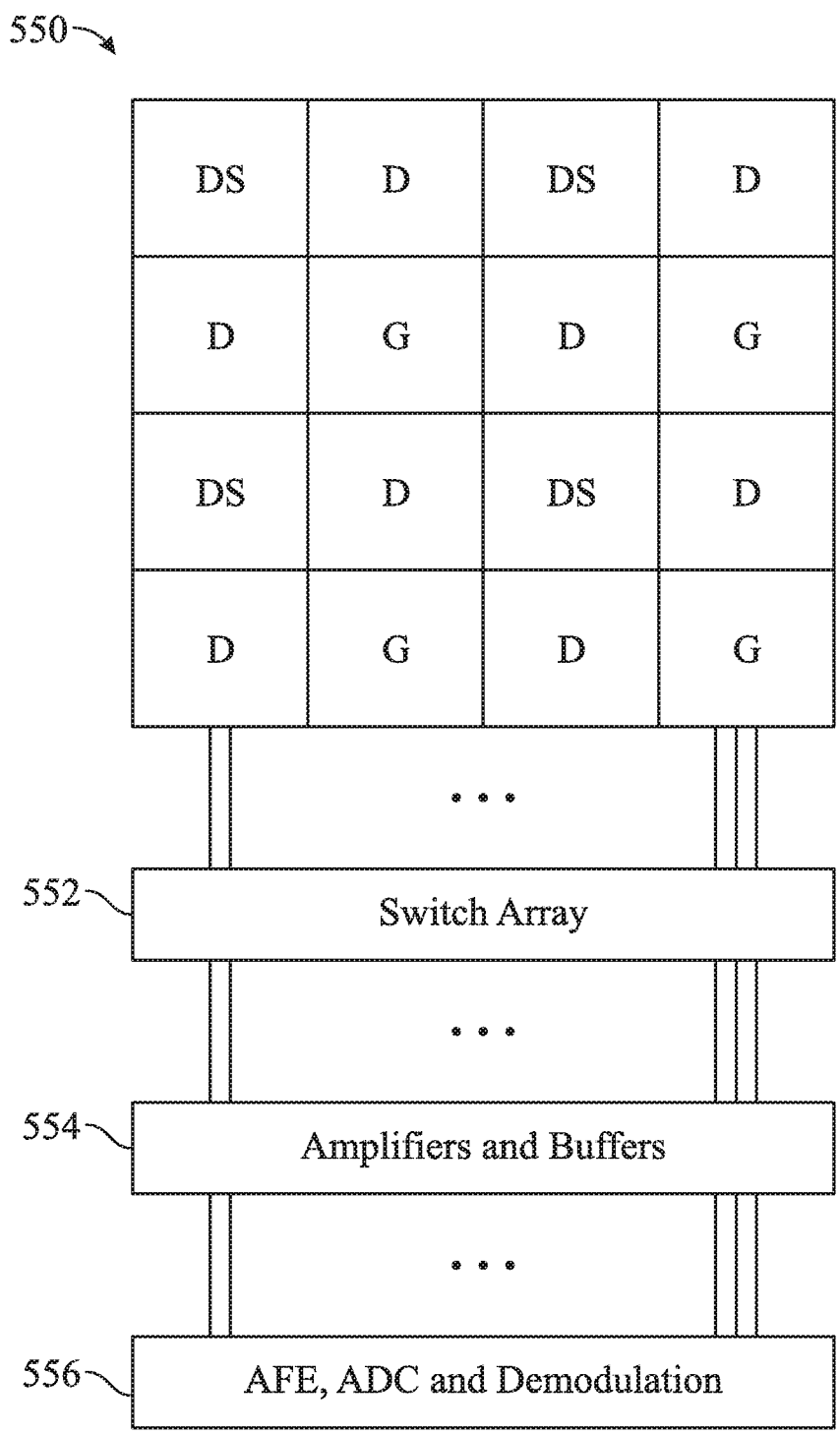
FIG. 5B illustrates an exemplary configuration of a partially bootstrapped touch screen that can utilize a switch array to couple appropriate circuitry to touch pixels according to examples of the disclosure.

FIG. 5B illustrates an exemplary configuration of partially bootstrapped touch screen 550 that can utilize switch array 552 to couple appropriate circuitry to touch pixels. Touch pixels in touch screen 550 can be coupled to switch array 552. Switch array 552 can be coupled to amplifier circuitry section 554, which can include circuitry such as sense circuitry/circuitries 514, stimulation buffer(s) 516 and AC ground buffer(s) 518 illustrated in FIG. 5A. Amplifier circuitry section 554 can be coupled to touch processing circuitry 556, such as analog front-ends (AFEs), analog-to-digital converters (ADCs) and demodulation circuits for processing touch signals detected on touch screen 550.

Circuitry such as sense circuitry 514, stimulation buffer 516 and AC ground buffer 518 need not be permanently coupled to the touch pixels for proper touch screen operation. Instead, such circuitry can be coupled to the touch pixels through switch array 552 such that appropriate touch pixels can be coupled to appropriate circuitry only when needed. This can allow multiple touch pixels to share common circuitry, which can reduce the amount of circuitry needed for touch screen operation. For example, a first touch pixel that is to be driven and sensed (a first DS touch pixel) can be coupled to sense circuitry 514 using switch array 552. When a second touch pixel is to be driven and sensed (a second DS touch pixel), switch array can couple that same sense circuitry 514 to the second touch pixel to drive and sense the second touch pixel instead of the first touch pixel. Such switch array 552 operation can analogously apply to couple stimulation buffers 516 and AC ground buffers 518 to appropriate touch pixels. Switch array 552 can be any suitable switching network that can couple touch pixels to appropriate circuitry in amplifier circuitry section 554.

In some examples, touch pixels on touch screen 550 can be stimulated in a single stimulation configuration (e.g., a sense circuitry 514 in amplifier circuitry section 554 can stimulate and sense a single touch pixel at any moment in time). In some examples, touch pixels on touch screen 550 can be stimulated in a multi-stimulation configuration (e.g., a sense circuitry 514 in amplifier circuitry section 554 can stimulate and sense multiple touch pixels at any moment in time). In a multi-stimulation configuration, any suitable multi-stimulation scheme can be utilized, and can be implemented using switch array 552 as appropriate. For example, a Hadamard/Circulant matrix driving and sensing scheme can be utilized with receive-side coding in which the distribution of touch pixels that receive a positive phase stimulation signal and touch pixels that receive a negative phase stimulation signal can be equal for each touch scanning step, except for a common mode touch scanning step.

As illustrated in FIGS. 4B, 5A and 5B, at any one moment in time, it can be the case that only one out of every four touch pixels can be driven and sensed. Thus, only one-fourth of the total touch image can be captured. It can be beneficial to drive and sense every touch pixel at some point in time so as to capture a full touch image on the touch screen. It should be noted that the examples of the disclosure can be extended to other partial bootstrapping schemes in which different numbers and arrangements of touch pixels can be driven and sensed, driven but not sensed, and grounded; however, the examples of the disclosure will focus on the four-pixel configuration provided for ease of description.

Figure 6A:
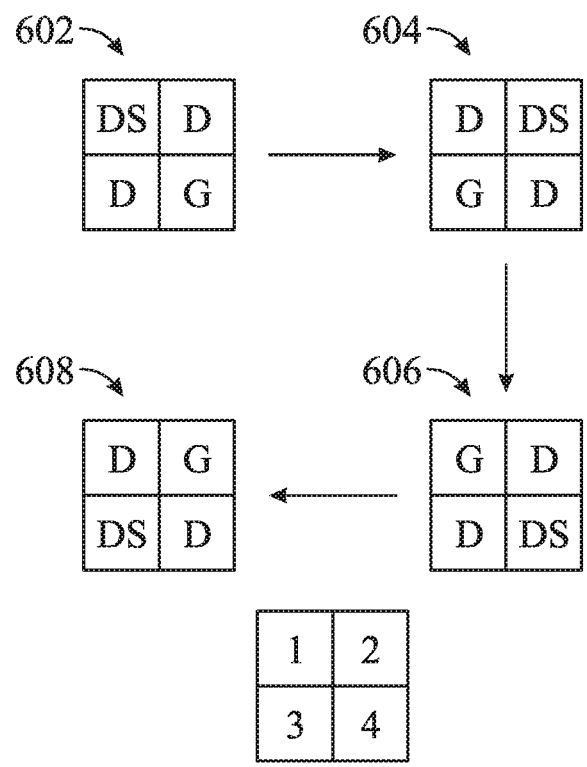
FIG. 6A illustrates an exemplary driving and sensing scheme in which every touch pixel on the touch screen can be driven and sensed at some point in time according to examples of the disclosure.

FIG. 6A illustrates an exemplary driving and sensing scheme in which every touch pixel on the touch screen can be driven and sensed at some point in time according to examples of the disclosure. The exemplary driving and sensing scheme of FIG. 6A illustrates the scheme as applied to four touch pixels, but it is understood that the scheme can similarly extend to additional touch pixels that may exist on the touch screen of the disclosure. For example, every group of four touch pixels on the touch screen can be driven, sensed and grounded as described below. In some examples, the groups of four touch pixels can be driven, sensed and grounded sequentially, one at a time. In some examples, the groups of four touch pixels can be driven, sensed and grounded at least partially simultaneously, more than one at a time. The appropriate numbers of sense circuitry 514, stimulation buffers 516 and/or AC ground buffers 518 that can be utilized can depend on the number of touch pixels on the touch screen, and whether the touch screen is to be operated in a single stimulation or multi-stimulation mode.

A first self-capacitance scan can be performed during a first self-capacitance scan time period, the touch pixels can be driven and sensed as shown in configuration 602. Specifically, the top-left touch pixel can be driven and sensed (DS touch pixel), the top-right and bottom-left touch pixels can be driven but not sensed (D touch pixels), and the bottom-right touch pixel can be grounded (G touch pixel).

The mechanisms for driving, sensing and/or grounding these touch pixels can be as described previously, and the details of which will not be repeated here for brevity.

After the first self-capacitance scan time period, a second self-capacitance scan can be performed during a second self-capacitance scan time period. During the second self-capacitance scan time period, the touch pixels can be driven and sensed as shown in configuration 604. Specifically, the top-right touch pixel can be driven and sensed, the top-left and bottom-right touch pixels can be driven but not sensed, and the bottom-left touch pixel can be grounded. In other words, the driving, sensing and grounding scheme of configuration 602 can be rotated in a clockwise direction to arrive at configuration 604. The driving, sensing and grounding scheme of configuration 604 can similarly be rotated in a clockwise direction to arrive at configuration 606 during a third self-capacitance scan time period, and again rotated in a clockwise direction to arrive at configuration 608 during a fourth self-capacitance scan time period. After the four self-capacitance scan time periods have elapsed, all of the touch pixels on the touch screen can have been driven and sensed—thus a full touch image can be captured—while the benefits of the partially bootstrapped driving and sensing scheme described previously can continue to be realized. It is understood that other driving and sensing configurations can be utilized to scan every touch pixel on the touch screen, and that the provided configurations are only one example. For example, the driving and sensing configurations can be rotated in a counter-clockwise direction instead of in a clockwise direction to achieve substantially the same result. Further, in some examples, the DS and G touch pixels need not be diagonally disposed, but rather can be adjacent touch pixels the techniques described in this disclosure can be appropriately adjusted for proper operation in such examples. Other spatial arrangement of DS, D and/or G touch pixels across the touch screen are similarly contemplated.

Each of the four driving and sensing configurations illustrated in FIG. 6A can be associated with its own attenuation factor. In accordance with the discussion of FIG. 4B, the attenuation factor for configuration 602 can be expressed as:

$$\alpha_1 = (C_g + \Sigma C_4)/C_{Total} \quad (7)$$

where $C_g$ can represent a capacitance between a finger (or other object) and system ground, $\Sigma C_4$ can be the total self-capacitance associated with touch pixels in position 4 (i.e., bottom-right) across the entire touch screen, and $C_{Total}$ can be $C_g + \Sigma C_1 + \Sigma C_2 + \Sigma C_3 + \Sigma C_4$. $\Sigma C_1$, $\Sigma C_2$, and $\Sigma C_3$ can be the total self-capacitance associated with touch pixels in positions 1 (top-left), 2 (top-right) and 3 (bottom-left), respectively, across the entire touch screen.

The attenuation factors for configurations 604, 606 and 608, respectively, can be analogously expressed as:

$$\alpha_2 = (C_g + \Sigma C_3)/C_{Total} \quad (8)$$

$$\alpha_3 = (C_g + \Sigma C_2)/C_{Total} \quad (9)$$

$$\alpha_4 = (C_g + \Sigma C_1)/C_{Total} \quad (10)$$

While the attenuation factors for the partially bootstrapped touch screen of the disclosure can be greater than the attenuation factor for a fully bootstrapped touch screen as described with respect to FIG. 4A, it can still be beneficial to correct for the partially bootstrapped attenuation so as to recover a greater magnitude of touch signal from the partially bootstrapped touch screen. Having a greater magnitude of touch signal can make identifying touch activity, and the associated touch processing, easier.

One way of canceling or correcting for the attenuation in the partially bootstrapped touch screen can be to scale the self-capacitance values measured at the touch screen by a scaling factor that can be the inverse of the above attenuation factors. In this way, the attenuation can be effectively completely canceled, and the unattenuated self-capacitance values for each touch pixel can be substantially recovered—or, the self-capacitance values associated with a well-grounded finger (or object) can be substantially determined. Exemplary scaling factors with which to scale the measured self-capacitance values for each of the driving and sensing configurations illustrated in FIG. 6A can be expressed as:

$$K_1 = 1/\alpha_1 = C_{Total}/(C_g + \Sigma C_4) \quad (11)$$

$$K_2 = 1/\alpha_2 = C_{Total}/(C_g + \Sigma C_3) \quad (12)$$

$$K_3 = 1/\alpha_3 = C_{Total}/(C_g + \Sigma C_2) \quad (13)$$

$$K_4 = 1/\alpha_4 = C_{Total}/(C_g + \Sigma C_1) \quad (14)$$

One difficulty in applying the above scaling can be that each of $C_g$, $\Sigma C_1$, $\Sigma C_2$, $\Sigma C_3$ and $\Sigma C_4$ can be unknown quantities, as $\Sigma C_1$, $\Sigma C_2$, $\Sigma C_3$ and $\Sigma C_4$ can represent the unattenuated total self-capacitances of touch pixels in those respective positions, not the measured (i.e., attenuated) self-capacitances of those touch pixels. $C_g$, the capacitance between a finger (or other object) and system ground can also be unknown. As a result, it can be necessary to perform further measurements in addition to the self-capacitance measurements discussed above to be able to determine the above scaling factors.

Figure 6B:
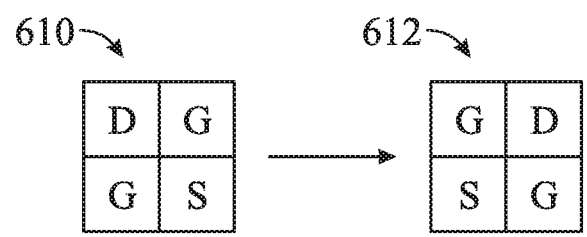
FIG. 6B illustrates an exemplary mutual capacitance driving and sensing scheme that can be utilized with the touch screen according to examples of the disclosure.

One way to determine the above scaling factors can be to perform one or more mutual capacitance measurements, in addition to the self-capacitance measurements, using the touch pixels of the disclosure. FIG. 6B illustrates an exemplary mutual capacitance driving and sensing scheme that can be utilized with the touch screen of the disclosure. The mutual capacitance driving and sensing scheme can be utilized before, after, or during the self-capacitance driving and sensing scheme described above. Additionally, the exemplary mutual capacitance driving and sensing scheme of FIG. 6B illustrates the scheme as applied to four touch pixels, but it is understood that the scheme can similarly extend to additional touch pixels that may exist on the touch screen of the disclosure. For example, every group of four touch pixels on the touch screen can be driven, sensed and grounded as described below. In some examples, the groups of four touch pixels can be driven, sensed and grounded sequentially, one at a time. In some examples, the groups of four touch pixels can be driven, sensed and grounded at least partially simultaneously, more than one at a time.

A first mutual capacitance scan can be performed during a first mutual capacitance scan time period. During the first mutual capacitance scan time period, the touch pixels of the touch screen can be driven and sensed as shown in configuration 610. Specifically, the top-left touch pixel can be driven (D touch pixel), the bottom-right touch pixel can be sensed (S touch pixel), and the top-right and bottom-left touch pixels (G touch pixels) can be grounded. This configuration 610 can allow for measurement of a mutual capacitance between the D and S touch pixels. The first mutual capacitance measurement obtained during the first mutual capacitance scan time period can be a common mode measurement (i.e., all of the sensed mutual capacitance signals between D and S touch pixels across the touch screen can be added together). In some examples, this common mode measurement can be obtained by stimulating multiple D touch pixels with a single stimulation buffer, grounding multiple G touch pixels with a single AC ground buffer, and/or sensing multiple S touch pixels with a single sense amplifier (e.g., sense circuitry). In some examples, touch pixels can be driven, sensed and/or grounded by individual stimulation buffers, sense amplifiers and/or AC ground buffers, and the resulting sense outputs can be added together to obtain the common mode mutual capacitance measurement. The mechanisms for driving, sensing and/or grounding the touch pixels can be similar to the schemes described previously (e.g., with respect to FIG. 5A), and/or other equivalent schemes, the details of which will not be repeated here for brevity.

After the first mutual capacitance scan time period, a second mutual capacitance scan can be performed during a second mutual capacitance scan time period. During the second mutual capacitance scan time period, the touch pixels can be driven and sensed as shown in configuration 612. Specifically, the top-right touch pixel can be driven, the bottom-left touch pixel can be sensed, and the top-left and bottom-right touch pixels can be grounded. The second mutual capacitance measurement obtained during the second mutual capacitance scan time period can also be a common mode measurement (i.e., all of the sensed mutual capacitance signals between D and S touch pixels across the touch screen can be added together). After the two mutual capacitance scan time periods have elapsed, mutual capacitance measurements between each pair of diagonal touch pixels on the touch screen can have been obtained. It is understood that other driving and sensing configurations can be utilized to obtain the mutual capacitance measurements of the examples of the disclosure, and that the provided configurations are only one example. For example, in configuration 610, instead of driving the top-left touch pixel and sensing the bottom-right touch pixel, the bottom-right touch pixel can be driven, and the top-left touch pixel can be sensed to achieve substantially the same result. It is understood that "mutual capacitance," as used in this disclosure, can refer to the nominal capacitance seen between multiple components (e.g., between D and S touch pixels) of the touch screen, or the change in the nominal capacitance seen between the multiple components of the touch screen, as appropriate.

FIG. 6C illustrates various capacitances associated with the mutual capacitance driving and sensing schemes of the disclosure. The mutual capacitance driving and sensing schemes illustrated in FIG. 6B can be designed to measure a through-finger (or through-object) mutual capacitance; e.g., a mutual capacitance measurement from a touch pixel to a finger or object (represented by node 618), and from the finger or object back to another touch pixel. However, a direct mutual capacitance that can exist directly between touch pixels can also be included in the measured results.

Specifically, the total common mode through-finger mutual capacitance measured in configuration 610 between the D touch pixel and the S touch pixel can be expressed as:

$$\Sigma C_{M14} = (\Sigma C_1 * \Sigma C_4)/C_{Total} - \Sigma C_{NM14} \quad (15)$$

where $\Sigma C_1$ and $\Sigma C_4$ can be the total self-capacitance between touch pixels in positions 1 (top-left) and 4 (bottom-right), respectively, and finger 618 across the entire touch screen. $C_{Total}$ can be $C_g + \Sigma C_1 + \Sigma C_2 + \Sigma C_3 + \Sigma C_4$, as before. Finally, $\Sigma C_{NM14}$ can be the total direct mutual capacitance ("near mutual capacitance") between touch pixels in positions 1 and 4.

Similarly, the total common mode through-finger mutual capacitance measured in configuration 612 between the D touch pixel and the S touch pixel can be expressed as:

$$\Sigma C_{M23} = (\Sigma C_2 * \Sigma C_3)/C_{Total} - \Sigma C_{NM23} \quad (16)$$

where $\Sigma C_2$ and $\Sigma C_3$ can be the total self-capacitance between touch pixels in positions 2 (top-right) and 3 (bottom-left), respectively, and finger 618 across the entire touch screen. $\Sigma C_{NM23}$ can be the total direct mutual capacitance ("near mutual capacitance") between touch pixels in positions 2 and 3.

Because $\Sigma C_{NM14}$ and $\Sigma C_{NM23}$ can be unwanted terms, approximations for those terms that can be based on electrical capacitance field simulation results can be determined and substituted into equations (15) and (16). These approximations can be based on one or more of the geometry/spacing of the touch pixels and the finger (object) position with respect to the touch pixels. Specifically, an approximate relationship between the self-capacitances and the mutual capacitance between diagonal touch pixels can be determined using electrical capacitance field simulations, and can be expressed as:

$$\Sigma C_{NM14} = \beta \cdot (\Sigma C_1 \cdot \Sigma C_4)/(\Sigma C_1 + \Sigma C_4) \quad (17)$$

$$\Sigma C_{NM23} = \beta \cdot (\Sigma C_2 \cdot \Sigma C_3)/(\Sigma C_2 + \Sigma C_3) \quad (18)$$

where $\beta$ can be approximated as a constant. By substituting equations (17) and (18) into equations (15) and (16), expressions for $\Sigma C_{M14}$ and $\Sigma C_{M23}$ can be obtained that can be functions of $C_1$, $C_2$, $C_3$, and $C_4$. Additionally, actual measurements for $\Sigma C_{M14}$ and $\Sigma C_{M23}$ can be obtained using the above-discussed mutual capacitance measurements.

In addition to the above measurements for $\Sigma C_{M14}$ and $\Sigma C_{M23}$, four self-capacitance measurements can be obtained across the touch screen during the four self-capacitance scan time periods discussed previously. These four measurements can be expressed as:

$$\Sigma XC_1 = \alpha_1 \cdot \Sigma C_1 - \Sigma C_{NM14} \quad (19)$$

$$\Sigma XC_2 = \alpha_2 \cdot \Sigma C_2 - \Sigma C_{NM23} \quad (20)$$

$$\Sigma XC_3 = \alpha_3 \cdot \Sigma C_3 - \Sigma C_{NM23} \quad (21)$$

$$\Sigma XC_4 = \alpha_4 \cdot \Sigma C_4 - \Sigma C_{NM14} \quad (22)$$

where $\Sigma XC_y$ can represent the total self-capacitance measured at touch pixels at position y across the touch screen, $\alpha_y$ can be as expressed in equations (7)-(10), $\Sigma C_y$ can be the total self-capacitance at touch pixels at position y across the touch screen, and $\Sigma C_{NMxy}$ can represent the total direct mutual capacitance ("near mutual capacitance") between touch pixels at positions x and y across the touch screen. This near mutual capacitance term can affect the self-capacitance that can be measured at each touch pixel, because this mutual capacitance can exist between DS touch pixels and G touch pixels, and can behave in a manner opposite to that of the self-capacitance (i.e., the absolute value of the near mutual capacitance can increase when the self-capacitance increases, but the change in the mutual capacitance can be opposite in sign to that of the change in self-capacitance). Therefore, the near mutual capacitance term can be included in equations (19)-(22), as shown.

Equations (15)-(16) and (19)-(22) can be manipulated to obtain equations for $\Sigma C_1$, $\Sigma C_2$, $\Sigma C_3$ and $\Sigma C_4$—the unattenuated total self-capacitance at touch pixels at positions 1, 2, 3 and 4, respectively. Specifically, these equations can be determined to be:

$$\sum C_1 = \left( \frac{\sum C_{M14}}{\sum XC_4 - \sum C_{M14}} + \beta \cdot \frac{\sum XC_1 - \sum C_{M14}}{\sum XC_1 + \sum XC_4 - 2 \cdot \sum C_{M14}} \right) \cdot \frac{1}{1 - \beta - \beta \cdot \frac{\sum XC_2 + \sum XC_3 - 2 \cdot \sum C_{M23}}{\sum XC_1 + \sum XC_4 - 2 \cdot \sum C_{M14}}} \cdot C_g \quad (23)$$

$$\sum C_2 = \left( \frac{\sum C_{M23}}{\sum XC_3 - \sum C_{M23}} + \beta \cdot \frac{\sum XC - \sum C_{M23}}{\sum XC_2 + \sum XC_3 - 2 \cdot \sum C_{M23}} \right) \cdot \frac{1}{1 - \beta - \beta \cdot \frac{\sum XC_1 + \sum XC_4 - 2 \cdot \sum C_{M14}}{\sum XC_2 + \sum XC_2 - 2 \sum C_{M23}}} \cdot C_g \quad (24)$$

$$\sum C_3 = \left( \frac{\sum C_{M23}}{\sum XC_2 - \sum C_{M23}} + \beta \cdot \frac{\sum XC_3 - \sum C_{M23}}{\sum XC_3 + \sum XC_3 - 2 \cdot \sum C_{M23}} \right) \cdot \frac{1}{1 - \beta - \beta \cdot \frac{\sum XC_1 + \sum XC_4 - 2 \cdot \sum C_{M14}}{\sum XC_2 + \sum XC_2 - 2 \sum C_{M23}}} \cdot C_g \quad (25)$$

$$\sum C_4 = \left( \frac{\sum C_{M14}}{\sum XC_1 - \sum C_{M14}} + \beta \cdot \frac{\sum XC_4 - \sum C_{M14}}{\sum XC_1 + \sum XC_4 - 2 \cdot \sum C_{M14}} \right) \cdot \frac{1}{1 - \beta - \beta \cdot \frac{\sum XC_2 + \sum XC_3 - 2 \cdot \sum C_{M23}}{\sum XC_1 + \sum XC_4 - 2 \sum C_{M14}}} \cdot C_g \quad (26)$$

In equations (23)-(26), the only unknown quantities can be $C_g$ and $\beta$, though $\beta$ can be approximated as an appropriate constant per an electrical capacitance field simulation result. The remaining terms can be known measurement quantities resulting from the four self-capacitance measurements and the two mutual capacitance measurements (e.g., $\Sigma XC_4$, $\Sigma C_{M14}$, etc.). Respective ones of equations (23)-(26) can be substituted into scaling factor equations (11)-(14) to obtain expressions for $K_1$, $K_2$, $K_3$ and $K_4$. For example, equation (26) can be substituted into equation (11) to obtain the following expression for $K_1$:

$$K_1 = \frac{1 + \left( \frac{\sum C_{M14}}{\sum XC_1 - \sum C_{M14}} + \frac{\sum C_{M14}}{\sum XC_4 - \sum C_{M14}} + \beta \right) \cdot \frac{1}{1 - \beta - \frac{\beta}{p}} + \left( \frac{\sum C_{M23}}{\sum XC_2 - \sum C_{M23}} + \frac{\sum C_{M23}}{\sum XC_3 - \sum C_{M23}} + \beta \right) \cdot \frac{1}{1 - \beta - \beta \cdot p}}{1 + \left( \frac{\sum C_{M14}}{\sum XC_1 - \sum C_{M14}} + \beta \cdot \frac{\sum XC_4 - \sum C_{M14}}{\sum XC_1 + \sum XC_4 - 2 \cdot \sum C_{M14}} \right) \cdot \frac{1}{1 - \beta - \frac{\beta}{p}}} \quad (27)$$

where:

$$p = \frac{\sum XC_1 + \sum XC_4 - 2\cdot\sum C_{M14}}{\sum XC_2 + \sum XC_3 - 2\sum C_{M23}} \quad (28)$$

In equation (27), the only unknown quantity can be β, as $C_g$ from equations (11) and (26) can cancel out of the numerator and the denominator. β can be approximated as an appropriate constant per an electrical capacitance field simulation result, and the remaining terms can be known measurement quantities (e.g., $\Sigma XC_4$, $\Sigma C_{M14}$, etc.). Thus, $K_1$ can be determined based on the four self-capacitance and two mutual capacitance measurements obtained on the touch screen of the disclosure. A self-capacitance measurement obtained from a touch pixel at position 1 on the touch screen can then be scaled by $K_1$ to effectively cancel the attenuation that can result from partially bootstrapping the touch screen. Self-capacitance measurements obtained from touch pixels at positions 2, 3 and 4 on the touch screen can analogously be scaled by the appropriate scaling factors represented by the following equations to effectively cancel their respective attenuation:

$$K_2 = \frac{1+\left(\dfrac{\sum C_{M14}}{\sum XC_1 - \sum C_{M14}} + \dfrac{\sum C_{M14}}{\sum XC_4 - \sum C_{M14}} + \beta\right)\cdot\dfrac{1}{1-\beta-\dfrac{\beta}{p}} + \left(\dfrac{\sum C_{M23}}{\sum XC_2 - \sum C_{M23}} + \dfrac{\sum C_{M23}}{\sum XC_3 - \sum C_{M23}} + \beta\right)\cdot\dfrac{1}{1-\beta-\beta\cdot p}}{1+\left(\dfrac{\sum C_{M23}}{\sum XC_2 - \sum C_{M23}} + \beta\cdot\dfrac{\sum XC_3 - \sum C_{M23}}{\sum XC_2 + \sum XC_3 - 2\cdot\sum C_{M23}}\right)\cdot\dfrac{1}{1-\beta-\beta\cdot p}} \quad (29)$$

$$K_3 = \frac{1+\left(\dfrac{\sum C_{M14}}{\sum XC_1 - \sum C_{M14}} + \dfrac{\sum C_{M14}}{\sum XC_4 - \sum C_{M14}} + \beta\right)\cdot\dfrac{1}{1-\beta-\dfrac{\beta}{p}} + \left(\dfrac{\sum C_{M23}}{\sum XC_2 - \sum C_{M23}} + \dfrac{\sum C_{M23}}{\sum XC_3 - \sum C_{M23}} + \beta\right)\cdot\dfrac{1}{1-\beta-\beta\cdot p}}{1+\left(\dfrac{\sum C_{M23}}{\sum XC_3 - \sum C_{M23}} + \beta\cdot\dfrac{\sum XC_2 - \sum C_{M23}}{\sum XC_2 + \sum XC_3 - 2\cdot\sum C_{M23}}\right)\cdot\dfrac{1}{1-\beta-\beta\cdot p}} \quad (30)$$

$$K_4 = \frac{1+\left(\dfrac{\sum C_{M14}}{\sum XC_1 - \sum C_{M14}} + \dfrac{\sum C_{M14}}{\sum XC_4 - \sum C_{M14}} + \beta\right)\cdot\dfrac{1}{1-\beta-\dfrac{\beta}{p}} + \left(\dfrac{\sum C_{M23}}{\sum XC_2 - \sum C_{M23}} + \dfrac{\sum C_{M23}}{\sum XC_3 - \sum C_{M23}} + \beta\right)\cdot\dfrac{1}{1-\beta-\beta\cdot p}}{1+\left(\dfrac{\sum C_{M14}}{\sum XC_4 - \sum C_{M14}} + \beta\cdot\dfrac{\sum XC_1 - \sum C_{M14}}{\sum XC_1 + \sum XC_4 - 2\cdot\sum C_{M14}}\right)\cdot\dfrac{1}{1-\beta-\dfrac{\beta}{p}}} \quad (31)$$

Alternatively to scaling touch pixels at respective positions with individual scaling factors, in some examples, all self-capacitance measurements obtained at all touch pixels on the touch screen can be scaled by an average scaling factor. The average scaling factor can provide sufficient accuracy such that individualized scaling factors may not be required. The average scaling factor of the partially bootstrapped touch screen can be expressed as:

$$K_{ave} = \frac{1}{\dfrac{\alpha_1+\alpha_2+\alpha_3+\alpha_4}{4}} = \frac{4}{\dfrac{3}{\left(\dfrac{\sum C_{M14}}{\sum XC_1 - \sum C_{M14}} + \dfrac{\sum C_{M14}}{\sum XC_4 - \sum C_{M14}} + \dfrac{\sum C_{M23}}{\sum XC_2 - \sum C_{M23}} + \dfrac{\sum C_{M23}}{\sum XC_3 - \sum C_{M23}} + 1\right)\cdot\dfrac{1}{1-2\cdot\beta}}+1} \quad (32)$$

As described above, attenuation of touch signals that may be detected on the touch screen of the disclosure can be effectively canceled by scaling the touch signals with scaling factors, which can be determined using four self-capacitance measurements and two mutual capacitance measurements. FIG. 6D illustrates exemplary touch frame 630 for sensing touch on the touch screen of the disclosure. Touch frame 630 can be a period of time during which touch can be detected on the touch screen of the disclosure. Touch frame 630 can correspond to or occur during a touch sensing phase of the touch screen, for example, and can be preceded by and/or followed by a display phase of the touch screen. In some examples, touch frame 630 can be preceded by and/or followed by another touch frame.

Touch frame 630 can include four self-capacitance scan steps (SC1 632, SC2 634, SC3 636 and SC4 638) and two common mode mutual capacitance scan steps (MC1 640 and MC2 642). The four self-capacitance scan steps and two common mode mutual capacitance scan steps can correspond to the self-capacitance and mutual capacitance measurements described previously. Touch frame 630 can also include additional scan steps as needed (e.g., a spectrum analysis step to determine low noise touch screen operating frequencies). The lengths of time of the self-capacitance scan steps SC1 632, SC2 634, SC3 636 and SC4 638 can be substantially the same, and the lengths of time of the mutual capacitance scan steps MC1 640 and MC2 642 can be substantially the same. The lengths of time of the self-capacitance scan steps can be the same as the lengths of time of the mutual capacitance scan steps or can be different from the lengths of time of the mutual capacitance scan steps. The illustrated ordering of the self-capacitance and mutual capacitance scan steps is exemplary only, and it is understood that the illustrated order can be modified without departing from the scope of the disclosure (e.g., the mutual capacitance scan steps can be interspersed with the self-capacitance scan steps).

Thus, the examples of the disclosure provide one or more configurations for compensating a touch signal detected on a partially bootstrapped pixelated self-capacitance touch screen resulting from touch activity by an ungrounded user or object.

Therefore, according to the above, some examples of the disclosure are directed to a touch controller comprising: sense circuitry configured to: sense, during a self-capacitance portion of a touch frame, first one or more self-capacitances associated with a first plurality of touch pixels on a touch sensor panel, and sense, during a mutual capacitance portion of the touch frame, first one or more mutual capacitances associated with the first plurality of touch pixels; and a touch processor configured to, based on the first one or more self-capacitances and the first one or more mutual capacitances, sense a single touch event associated with the touch frame. Additionally or alternatively to one or more of the examples disclosed above, in some examples, the first one or more self-capacitances comprise a first self-capacitance associated with a first touch pixel, and the first one or more mutual capacitances comprise a first mutual-capacitance associated with the first touch pixel and a second touch pixel. Additionally or alternatively to one or more of the examples disclosed above, in some examples, the touch processor is further configured to adjust the first self-capacitance based on the first mutual capacitance. Additionally or alternatively to one or more of the examples disclosed above, in some examples, adjusting the first self-capacitance comprises scaling the first self-capacitance by a first scaling factor based on the first self-capacitance and the first mutual capacitance. Additionally or alternatively to one or more of the examples disclosed above, in some examples, the first one or more self-capacitances further comprise a second self-capacitance associated with the second touch pixel, a third self-capacitance associated with a third touch pixel, and a fourth self-capacitance associated with a fourth touch pixel on the touch sensor panel, the first one or more mutual capacitances further comprise a second mutual capacitance associated with the third touch pixel and the fourth touch pixel, and adjusting the first self-capacitance comprises adjusting the first self-capacitance based on the first, second, third and fourth self-capacitances, and the first and second mutual capacitances. Additionally or alternatively to one or more of the examples disclosed above, in some examples, the touch processor is further configured to: adjust the second self-capacitance based on the first, second, third and fourth self-capacitances, and the first and second mutual capacitances. Additionally or alternatively to one or more of the examples disclosed above, in some examples, adjusting the first self-capacitance comprises scaling the first self-capacitance by a first scaling factor, and adjusting the second self-capacitance comprises scaling the second self-capacitance by a second scaling factor, different from the first scaling factor. Additionally or alternatively to one or more of the examples disclosed above, in some examples, adjusting the first self-capacitance comprises scaling the first self-capacitance by an average scaling factor, and adjusting the second self-capacitance comprises scaling the second self-capacitance by the average scaling factor. Additionally or alternatively to one or more of the examples disclosed above, in some examples, the sense circuitry is further configured to: sense second one or more self-capacitances associated with a second plurality of touch pixels on the touch sensor panel, different from the first plurality of touch pixels, and sense second one or more mutual capacitances associated with the second plurality of touch pixels, and the touch processor is further configured to, based on the second one or more self-capacitances and the second one or more mutual capacitances, sense the single touch event. Additionally or alternatively to one or more of the examples disclosed above, in some examples, the sense circuitry is configured to concurrently sense the first one or more self-capacitances and the second one or more self-capacitances. Additionally or alternatively to one or more of the examples disclosed above, in some examples, the sense circuitry is configured to sequentially sense the first one or more self-capacitances and the second one or more self-capacitances.

Some examples of the disclosure are directed to a method comprising: sensing, during a self-capacitance portion of a touch frame, first one or more self-capacitances associated with a first plurality of touch pixels on a touch sensor panel; sensing, during a mutual capacitance portion of the touch frame, first one or more mutual capacitances associated with the first plurality of touch pixels; and based on the first one or more self-capacitances and the first one or more mutual capacitances, sensing a single touch event associated with the touch frame. Additionally or alternatively to one or more of the examples disclosed above, in some examples, the first one or more self-capacitances comprise a first self-capacitance associated with a first touch pixel, and the first one or more mutual capacitances comprise a first mutual-capacitance associated with the first touch pixel and a second touch pixel. Additionally or alternatively to one or more of the examples disclosed above, in some examples, the method further comprises adjusting the first self-capacitance based on the first mutual capacitance. Additionally or alternatively to one or more of the examples disclosed above, in some examples, adjusting the first self-capacitance comprises scaling the first self-capacitance by a first scaling factor based on the first self-capacitance and the first mutual capacitance. Additionally or alternatively to one or more of the examples disclosed above, in some examples, the first one or more self-capacitances further comprise a second self-capacitance associated with the second touch pixel, a third self-capacitance associated with a third touch pixel, and a fourth self-capacitance associated with a fourth touch pixel on the touch sensor panel, the first one or more mutual capacitances further comprise a second mutual capacitance associated with the third touch pixel and the fourth touch pixel, and adjusting the first self-capacitance comprises adjusting the first self-capacitance based on the first, second, third and fourth self-capacitances, and the first and second mutual capacitances. Additionally or alternatively to one or more of the examples disclosed above, in some examples, the method further comprises adjusting the second self-capacitance based on the first, second, third and fourth self-capacitances, and the first and second mutual capacitances. Additionally or alternatively to one or more of the examples disclosed above, in some examples, adjusting the first self-capacitance comprises scaling the first self-capacitance by a first scaling factor, and adjusting the second self-capacitance comprises scaling the second self-capacitance by a second scaling factor, different from the first scaling factor. Additionally or alternatively to one or more of the examples disclosed above, in some examples, adjusting the first self-capacitance comprises scaling the first self-capacitance by an average scaling factor, and adjusting the second self-capacitance comprises scaling the second self-capacitance by the average scaling factor. Additionally or alternatively to one or more of the examples disclosed above, in some examples, the method further comprises: sensing second one or more self-capacitances associated with a second plurality of touch pixels on the touch sensor panel, different from the first plurality of touch pixels, and sensing second one or more mutual capacitances associated with the second plurality of touch pixels, and based on the second one or more self-capacitances and the second one or more mutual capacitances, sensing the single touch event. Additionally or alternatively to one or more of the examples disclosed above, in some examples, sensing the first one or more self-capacitances is concurrent with sensing the second one or more self-capacitances. Additionally or alternatively to one or more of the examples disclosed above, in some examples, sensing the second one or more self-capacitances is sequential to sensing the first one or more self-capacitances.

Some examples of the disclosure are directed to a touch sensor panel comprising: a plurality of touch pixels, the plurality of touch pixels including a first touch pixel, a second touch pixel, a third touch pixel, and a fourth touch pixel; and sense circuitry configured to: during a first time period, drive the first touch pixel, and ground the fourth touch pixel; during a second time period, drive the second touch pixel, and ground the third touch pixel; during a third time period, drive the third touch pixel, and ground the second touch pixel; during a fourth time period, drive the fourth touch pixel, and ground the first touch pixel; during a fifth time period, drive the first touch pixel, and ground the second and third touch pixels; and during a sixth time period, drive the second touch pixel, and ground the first and fourth touch pixels.

Some examples of the disclosure are directed to a touch sensor panel comprising: a plurality of touch pixels, the plurality of touch pixels including a first touch pixel, a second touch pixel, a third touch pixel, and a fourth touch pixel; and sense circuitry configured to: during a first time period, sense a first self-capacitance of the first touch pixel; during a second time period, sense a second self-capacitance of the second touch pixel; during a third time period, sense a third self-capacitance of the third touch pixel; during a fourth time period, sense a fourth self-capacitance of the fourth touch pixel; during a fifth time period, sense a first mutual capacitance of the first touch pixel and the fourth touch pixel; and during a sixth time period, sense a second mutual capacitance of the second touch pixel and the third touch pixel.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A touch controller comprising:
   sense circuitry configured to:
   perform, during one or more self-capacitance portions of a touch frame, a first plurality of self-capacitance scans associated with a first plurality of touch pixels on a touch sensor panel to generate self-capacitance information associated with the first plurality of touch pixels, the first plurality of self-capacitance scans comprising:
     a first self-capacitance scan of a first touch pixel to determine a first self-capacitance associated with the first touch pixel by driving and sensing the first touch pixel and driving but not sensing a second touch pixel, and
     a second self-capacitance scan of the second touch pixel to determine a second self-capacitance associated with the second touch pixel by driving and sensing the second touch pixel and driving but not sensing the first touch pixel;
   perform, during a mutual capacitance portion of the touch frame, different than the one or more self-capacitance portions of the touch frame, first one or more mutual capacitance scans associated with the first plurality of touch pixels to generate mutual capacitance information associated with the first plurality of touch pixels, wherein the first one or more mutual capacitance scans determine a first mutual capacitance between the first touch pixel and the second touch pixel; and
   a touch processor configured to use the self-capacitance information associated with the first plurality of touch pixels and the mutual capacitance information to sense a single touch event associated with the touch frame, wherein sensing the single touch event includes determining a first self-capacitance touch value for the first touch pixel by scaling the first self-capacitance by a first scaling factor based on the first and second self-capacitances and the first mutual capacitance.

2. The touch controller of claim 1, wherein the touch processor is further configured to:
   determine a second self-capacitance touch value for the second touch pixel based on the first and second self-capacitances, and the first mutual capacitance.

3. The touch controller of claim 2, wherein:
   determining the second self-capacitance touch value comprises scaling the second self-capacitance by a second scaling factor, different from the first scaling factor.

4. The touch controller of claim 2, wherein:
scaling the first self-capacitance by the first scaling factor comprises scaling the first self-capacitance by an average scaling factor; and
determining the second self-capacitance touch value comprises scaling the second self-capacitance by the average scaling factor.

5. The touch controller of claim 1, wherein the sense circuitry is configured to sequentially perform the first plurality of self-capacitance scans of the first plurality of touch pixels.

6. The touch controller of claim 1, wherein the first and second touch pixels are arranged as part of a 2×2 configuration on the touch sensor panel.

7. The touch controller of claim 1, wherein the touch processor is further configured to adjust the second self-capacitance based on the first and second self-capacitances, and the first mutual capacitance, and the touch processor is configured to adjust the first self-capacitance differently than the second self-capacitance.

8. A method comprising:
performing, during one or more self-capacitance portions of a touch frame, a first plurality of self-capacitance scans associated with a first plurality of touch pixels on a touch sensor panel to generate self-capacitance information associated with the first plurality of touch pixels, the first plurality of self-capacitance scans comprising:
a first self-capacitance scan of a first touch pixel to determine a first self-capacitance associated with the first touch pixel by driving and sensing the first touch pixel and not sensing a second touch pixel, and
a second self-capacitance scan of the second touch pixel to determine a second self-capacitance associated with the second touch pixel by driving and sensing the second touch pixel and driving but not sensing the first touch pixel;
performing, during a mutual capacitance portion of the touch frame, different than the one or more self-capacitance portions of the touch frame, first one or more mutual capacitance scans associated with the first plurality of touch pixels to generate mutual capacitance information associated with the first plurality of touch pixels, wherein the first one or more mutual capacitance scans determine a first mutual capacitance between the first touch pixel and the second touch pixel; and
using the self-capacitance information associated with the first plurality of touch pixels and the mutual capacitance information, sensing a single touch event associated with the touch frame, wherein sensing the single touch event includes determining a first self-capacitance touch value for the first touch pixel by scaling the first self-capacitance by a first scaling factor based on the first and second self-capacitances and the first mutual capacitance.

9. The method of claim 8, further comprising determining a second self-capacitance touch value for the second touch pixel based on the first and second self-capacitances, and the first mutual capacitance.

10. The method of claim 9, wherein:
determining the second self-capacitance touch value comprises scaling the second self-capacitance by a second scaling factor, different from the first scaling factor.

11. The method of claim 9, wherein:
scaling the first self-capacitance by the first scaling factor comprises scaling the first self-capacitance by an average scaling factor, and
determining the second self-capacitance touch value comprises scaling the second self-capacitance by the average scaling factor.

12. The method of claim 8, wherein the self-capacitance scans of the first plurality of touch pixels are performed sequentially.

13. The method of claim 8, wherein the first and second touch pixels are arranged as part of a 2×2 configuration on the touch sensor panel.

14. The method of claim 8, further comprising adjusting the second self-capacitance based on the first and second self-capacitances, and the first mutual capacitance, and adjusting the first self-capacitance differently than the second self-capacitance.

* * * * *